United States Patent
Yanami et al.

(10) Patent No.: US 8,412,494 B2
(45) Date of Patent: Apr. 2, 2013

(54) OPTIMAL SOLUTION RELATION DISPLAY APPARATUS AND OPTIMAL SOLUTION RELATION DISPLAY METHOD

(75) Inventors: Hitoshi Yanami, Kawasaki (JP); Hirokazu Anai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 883 days.

(21) Appl. No.: 12/491,925

(22) Filed: Jun. 25, 2009

(65) Prior Publication Data

US 2010/0057410 A1 Mar. 4, 2010

(30) Foreign Application Priority Data

Sep. 4, 2008 (JP) ................................. 2008-226962

(51) Int. Cl.
G06F 17/10 (2006.01)
(52) U.S. Cl. .......................................................... 703/2
(58) Field of Classification Search ........ 703/2; 708/290
See application file for complete search history.

(56) References Cited

U.S. PATENT DOCUMENTS

| | | | |
|---|---|---|---|
| 6,993,462 B1 * | 1/2006 | Pavlovi et al. ..................... | 703/2 |
| 7,254,564 B2 * | 8/2007 | Coppola et al. ................... | 706/21 |
| 2004/0024715 A1 * | 2/2004 | Ouimet ........................... | 705/400 |
| 2004/0076333 A1 * | 4/2004 | Zhang et al. .................... | 382/238 |

FOREIGN PATENT DOCUMENTS

| | | |
|---|---|---|
| JP | A 7-44611 | 2/1995 |
| JP | 2004-118719 | 4/2004 |
| JP | 2006-285381 | 10/2006 |
| JP | 2010-042599 | 2/2010 |

OTHER PUBLICATIONS

Hirokazu Anai et al., "Introduction to Computational Real Algebraic Geometry: Overview of CAD and QE," Sugaku Seminar, No. 11, 2007, 20 pages.
Japanese office action issued in corresponding Japanese Patent App. No. 2008-226962, dated Oct. 23, 2012.
Kobayashi et al.; "Mechanism of Genetic Algorithm for maintaining the solution diversity using Neural Network"; IPSJ SIG Technical Reports; 2006-MPS-61; Sep. 14-15, 2006; pp. 41-44.

* cited by examiner

Primary Examiner — Kamini S Shah
Assistant Examiner — Luke Osborne
(74) Attorney, Agent, or Firm — Greer, Burns & Crain, Ltd.

(57) ABSTRACT

An apparatus receives input of sample sets, each including a set of values of design parameters and a set of values of objective functions; calculates objective function approximating equations; and selects, as initial candidates for an optimal design parameter set, some sets of values of design parameters corresponding to non-dominated solutions. The apparatus calculates one or more interpolating design parameter sets interpolating between two adjacent components in the candidates; and approximates values of the objective functions for each interpolating design parameter set. The apparatus selects an optimal interpolating design parameter set corresponding to a non-dominated solution in the cost evaluation for a pair of objective functions; and integrates it into the candidates. The apparatus repeats processes on the new candidates while determining the parameter distance between components of the new candidates. Finally obtained new candidates are output as final optimal design parameter sets and information relating to it is displayed.

20 Claims, 23 Drawing Sheets

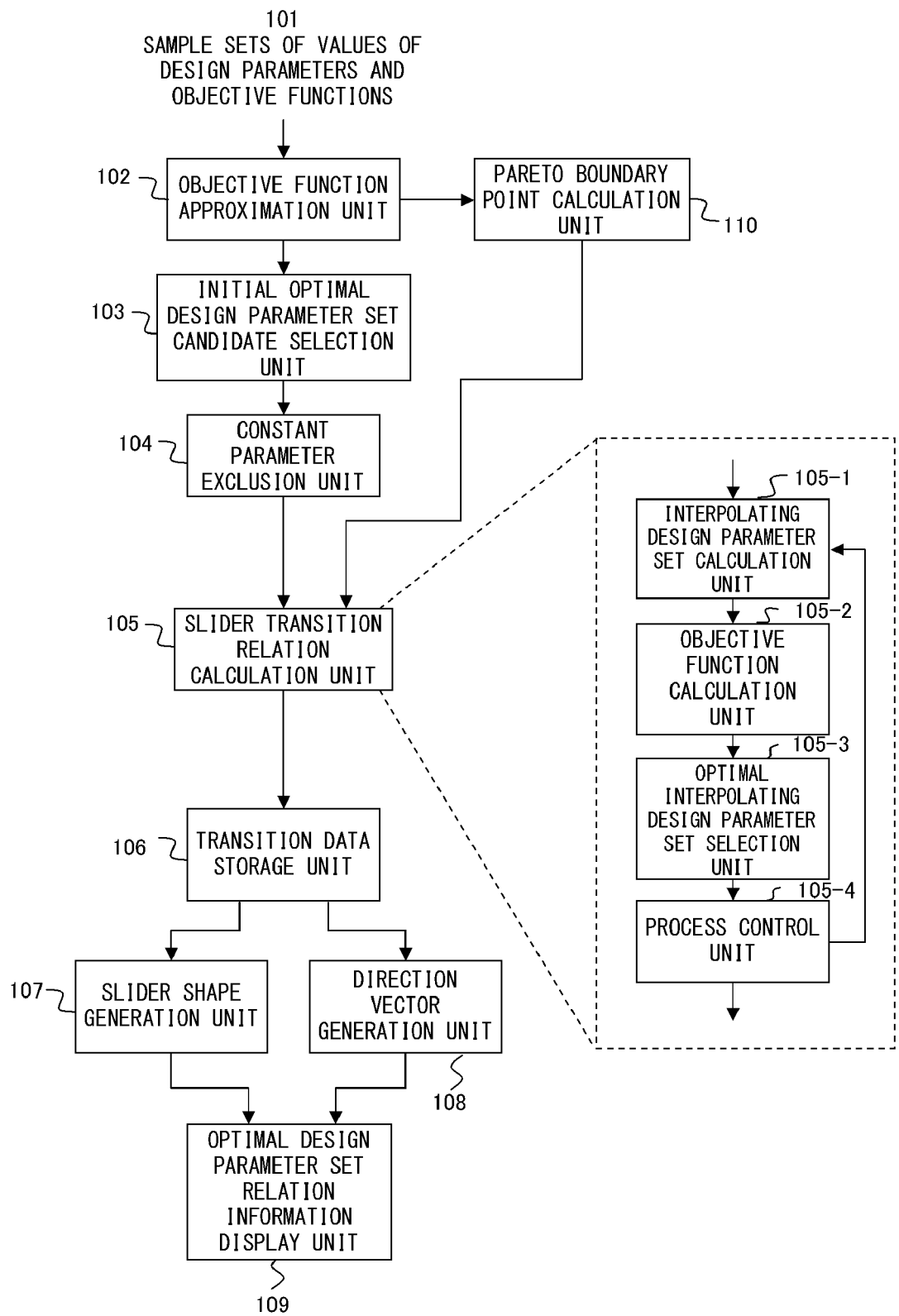
F I G. 1

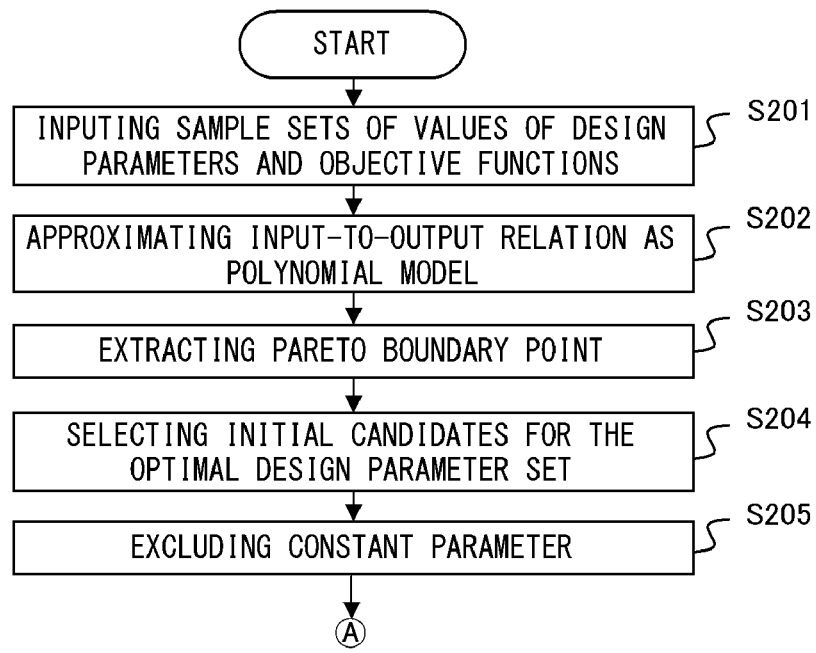
F I G. 2 A

|   | A | B | C | D | E | F | G | H | I |
|---|---|---|---|---|---|---|---|---|---|
| 1 | cost2 | x1 | x2 | x3 | x4 | x5 | x6 | x7 | x8 |
| 2 | 9.00E+00 | 5.00E-01 | 5.00E-01 | 5.00E-01 | 5.00E-01 | 5.00E-01 | 5.00E-01 | 5.00E-01 | 5.00E-01 |
| 3 | 9.43E+00 | 1.67E-01 | 5.00E-01 | 5.00E-01 | 5.00E-01 | 5.00E-01 | 5.00E-01 | 5.00E-01 | 5.00E-01 |
| 4 | 9.70E+00 | 8.33E-01 | 5.00E-01 | 5.00E-01 | 5.00E-01 | 5.00E-01 | 5.00E-01 | 5.00E-01 | 5.00E-01 |
| 5 | 9.10E+00 | 5.00E-01 | 1.67E-01 | 5.00E-01 | 5.00E-01 | 5.00E-01 | 5.00E-01 | 5.00E-01 | 5.00E-01 |
| 6 | 9.40E+00 | 5.00E-01 | 8.33E-01 | 5.00E-01 | 5.00E-01 | 5.00E-01 | 5.00E-01 | 5.00E-01 | 5.00E-01 |
| 7 | 4.54E+00 | 5.00E-01 | 5.00E-01 | 1.67E-01 | 5.00E-01 | 5.00E-01 | 5.00E-01 | 5.00E-01 | 5.00E-01 |
| 8 | 1.16E+01 | 5.00E-01 | 5.00E-01 | 8.33E-01 | 5.00E-01 | 5.00E-01 | 5.00E-01 | 5.00E-01 | 5.00E-01 |
| 9 | 1.05E+01 | 5.00E-01 | 5.00E-01 | 5.00E-01 | 1.67E-01 | 5.00E-01 | 5.00E-01 | 5.00E-01 | 5.00E-01 |
| 10 | 2.05E+00 | 5.00E-01 | 5.00E-01 | 5.00E-01 | 8.33E-01 | 5.00E-01 | 5.00E-01 | 5.00E-01 | 5.00E-01 |
| 11 | 4.10E+00 | 5.00E-01 | 5.00E-01 | 5.00E-01 | 5.00E-01 | 1.67E-01 | 5.00E-01 | 5.00E-01 | 5.00E-01 |
| 12 | 1.52E+01 | 5.00E-01 | 5.00E-01 | 5.00E-01 | 5.00E-01 | 8.33E-01 | 5.00E-01 | 5.00E-01 | 5.00E-01 |
| 13 | 5.29E+00 | 5.00E-01 | 5.00E-01 | 5.00E-01 | 5.00E-01 | 5.00E-01 | 1.67E-01 | 5.00E-01 | 5.00E-01 |
| 14 | 1.10E+01 | 5.00E-01 | 5.00E-01 | 5.00E-01 | 5.00E-01 | 5.00E-01 | 8.33E-01 | 5.00E-01 | 5.00E-01 |
| 15 | 1.02E+01 | 5.00E-01 | 5.00E-01 | 5.00E-01 | 5.00E-01 | 5.00E-01 | 5.00E-01 | 1.67E-01 | 5.00E-01 |
| 16 | 3.96E+00 | 5.00E-01 | 5.00E-01 | 5.00E-01 | 5.00E-01 | 5.00E-01 | 5.00E-01 | 8.33E-01 | 5.00E-01 |
| 17 | 4.86E+00 | 5.00E-01 | 5.00E-01 | 5.00E-01 | 5.00E-01 | 5.00E-01 | 5.00E-01 | 5.00E-01 | 1.67E-01 |
| 18 | 1.47E+01 | 5.00E-01 | 5.00E-01 | 5.00E-01 | 5.00E-01 | 5.00E-01 | 5.00E-01 | 5.00E-01 | 8.33E-01 |
| 19 | 4.24E+00 | 1.67E-01 | 5.00E-01 | 5.00E-01 | 5.00E-01 | 1.67E-01 | 5.00E-01 | 5.00E-01 | 5.00E-01 |
| 20 | 4.95E+00 | 8.33E-01 | 5.00E-01 | 5.00E-01 | 5.00E-01 | 1.67E-01 | 5.00E-01 | 5.00E-01 | 5.00E-01 |
| 21 | 4.57E+00 | 5.00E-01 | 1.67E-01 | 5.00E-01 | 5.00E-01 | 1.67E-01 | 5.00E-01 | 5.00E-01 | 5.00E-01 |
| 22 | 4.89E+00 | 5.00E-01 | 8.33E-01 | 5.00E-01 | 5.00E-01 | 1.67E-01 | 5.00E-01 | 5.00E-01 | 5.00E-01 |
| 23 | 3.56E+00 | 5.00E-01 | 5.00E-01 | 1.67E-01 | 5.00E-01 | 1.67E-01 | 5.00E-01 | 5.00E-01 | 5.00E-01 |
| 24 | 7.63E+00 | 5.00E-01 | 5.00E-01 | 8.33E-01 | 5.00E-01 | 1.67E-01 | 5.00E-01 | 5.00E-01 | 5.00E-01 |

FIG. 3

|   | A | B | C | D | E | F | G | H | I | J |
|---|---|---|---|---|---|---|---|---|---|---|
| 1 | TotalCost | Cost1 | Cost2 | Cost3 | Cost4 | Cost5 | Cost6 | Cost7 | Cost8 | Cost9 |
| 2 | 3.37E+02 | 6.70E+01 | 5.06E+00 | 0.00E+00 | 1.19E-01 | 1.80E+00 | 2.18E+00 | 0.00E+00 | 1.03E+02 | 0.00E+00 |
| 3 | 3.73E+02 | 7.28E+01 | 5.63E+00 | 0.00E+00 | 2.84E-01 | 1.75E+00 | 2.15E+00 | 0.00E+00 | 1.09E+02 | 0.00E+00 |
| 4 | 3.11E+02 | 6.19E+01 | 4.67E+00 | 0.00E+00 | 0.00E+00 | 1.84E+00 | 2.21E+00 | 0.00E+00 | 1.00E+02 | 0.00E+00 |
| 5 | 3.00E+02 | 5.88E+01 | 4.52E+00 | 0.00E+00 | 0.00E+00 | 1.81E+00 | 2.14E+00 | 0.00E+00 | 9.79E-01 | 0.00E+00 |
| 6 | 3.84E+02 | 7.63E+01 | 5.93E+00 | 0.00E+00 | 3.01E-01 | 1.78E+00 | 2.21E+00 | 0.00E+00 | 1.08E+02 | 0.00E+00 |
| 7 | 3.85E+02 | 7.21E+01 | 5.67E+00 | 0.00E+00 | 1.17E-01 | 1.41E+00 | 1.73E+00 | 0.00E+00 | 1.43E+02 | 0.00E+00 |
| 8 | 3.04E+02 | 5.69E+01 | 4.22E+00 | 0.00E+00 | 9.71E-02 | 3.23E+00 | 2.92E+00 | 0.00E+00 | 7.90E+01 | 0.00E+00 |
| 9 | 3.94E+02 | 7.63E+01 | 5.65E+00 | 0.00E+00 | 1.16E-01 | 3.22E+00 | 2.65E+00 | 0.00E+00 | 1.17E+02 | 0.00E+00 |
| 10 | 2.91E+02 | 5.09E+01 | 4.28E+00 | 0.00E+00 | 8.20E-02 | 2.55E+00 | 4.27E+00 | 0.00E+00 | 7.14E+01 | 0.00E+00 |
| 11 | 3.46E+02 | 6.87E+01 | 5.69E+00 | 0.00E+00 | 1.82E-01 | 1.68E+00 | 2.05E+00 | 0.00E+00 | 1.00E+02 | 0.00E+00 |
| 12 | 3.42E+02 | 6.70E+01 | 4.86E+00 | 0.00E+00 | 6.75E-02 | 1.92E+00 | 2.33E+00 | 0.00E+00 | 1.11E+02 | 0.00E+00 |
| 13 | 3.17E+02 | 4.55E+01 | 3.43E+00 | 0.00E+00 | 4.42E-02 | 3.63E+00 | 2.99E+00 | 0.00E+00 | 1.22E+02 | 0.00E+00 |
| 14 | 3.66E+02 | 7.92E+01 | 8.38E+00 | 0.00E+00 | 1.61E-01 | 1.85E+00 | 2.21E+00 | 0.00E+00 | 6.98E+01 | 0.00E+00 |
| 15 | 4.11E+02 | 7.69E+01 | 8.40E+00 | 0.00E+00 | 1.54E-01 | 1.78E+00 | 2.03E+00 | 0.00E+00 | 1.23E+02 | 0.00E+00 |
| 16 | 1.91E+02 | 4.17E+01 | 3.08E+00 | 0.00E+00 | 1.30E-02 | 1.84E+00 | 2.97E+00 | 0.00E+00 | 2.82E-01 | 0.00E+00 |

FIG. 4

| INPUT PARAMETER SET | $x_1$ | $x_2$ | $x_3$ | ... | $x_{14}$ | $x_{15}$ |
|---|---|---|---|---|---|---|
| $A_1$ | 0.5 | 0.3 | 0.8 | ... | 0.8 | 0.3 |
| $A_2$ | 0.2 | 0.3 | 0.55 | ... | 0.8 | 0.2 |

F I G. 6

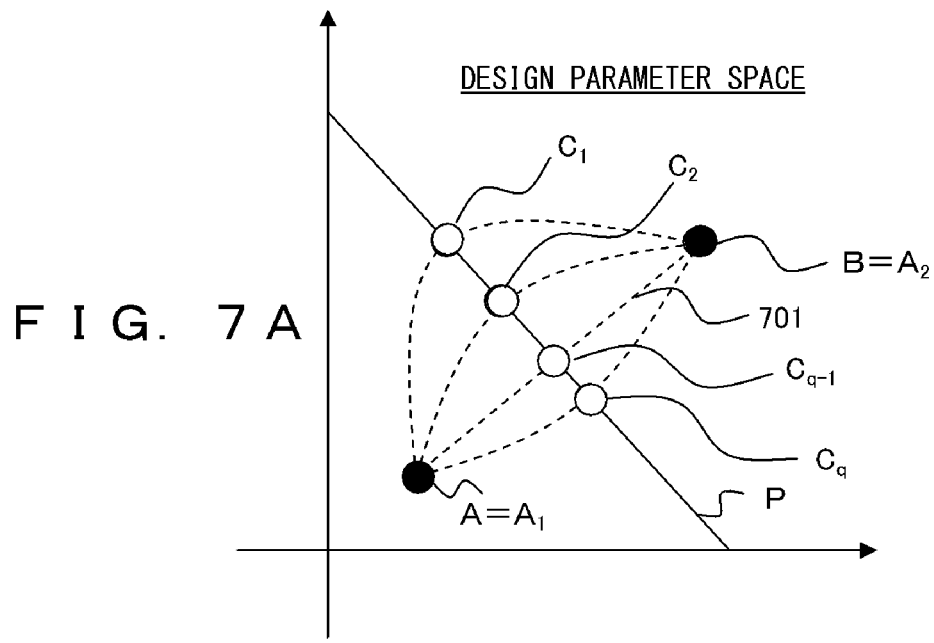
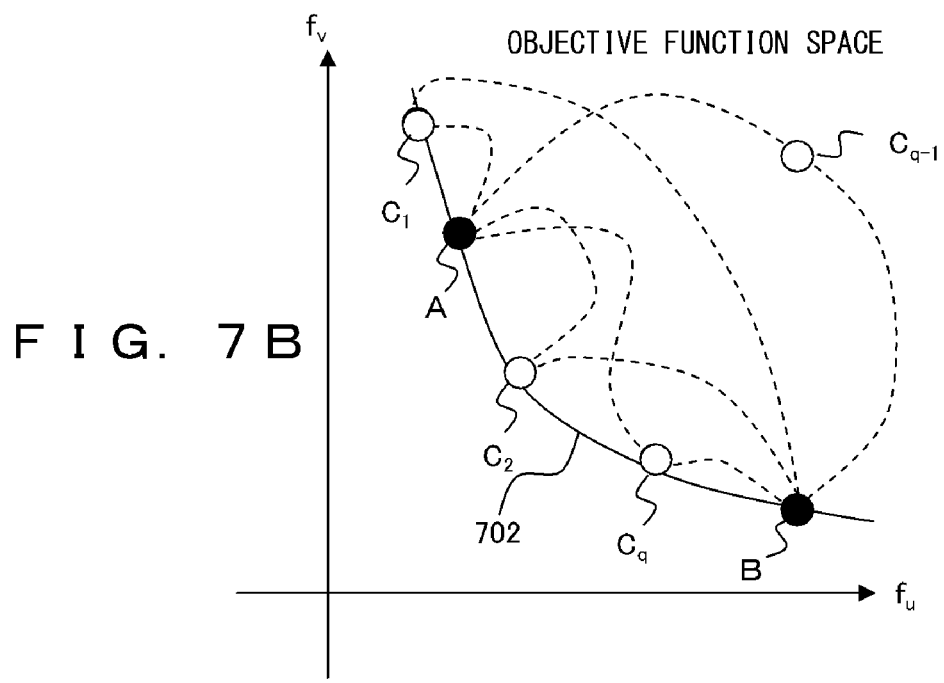

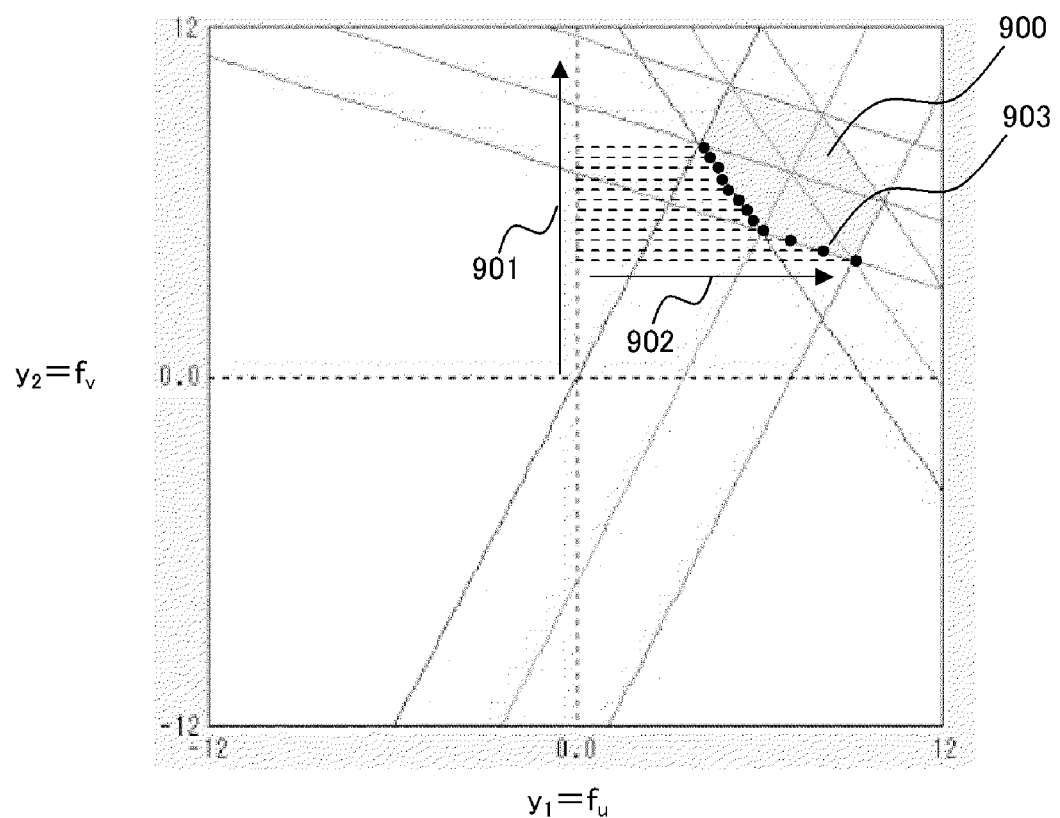
F I G. 9

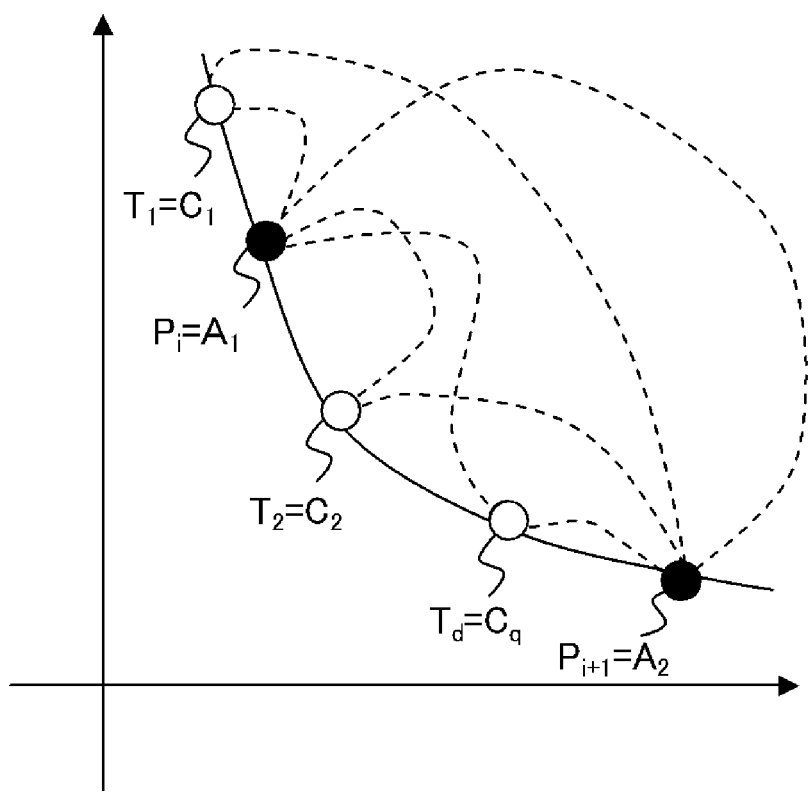
F I G. 1 1

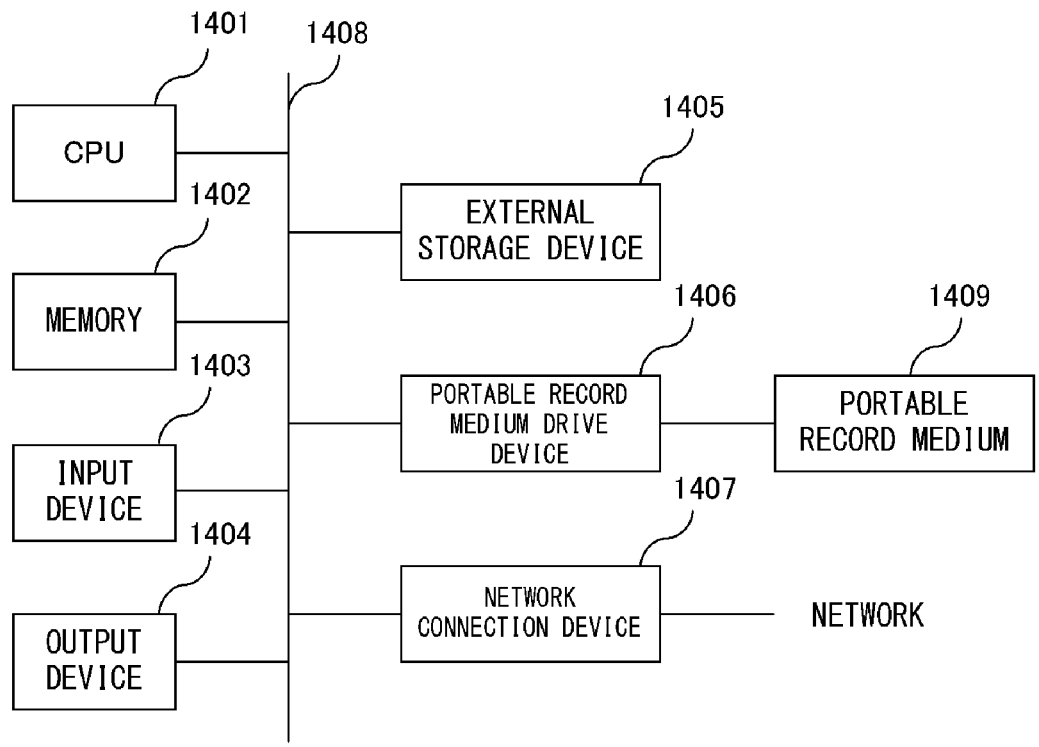
F I G. 14

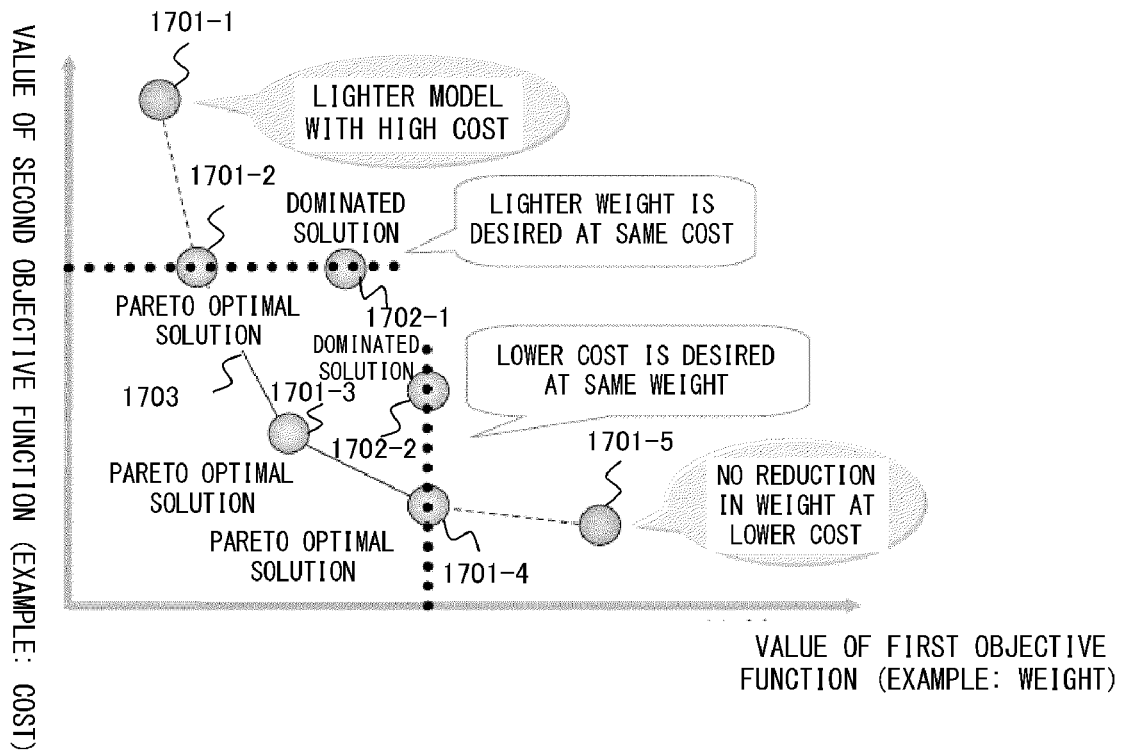
F I G. 1 7

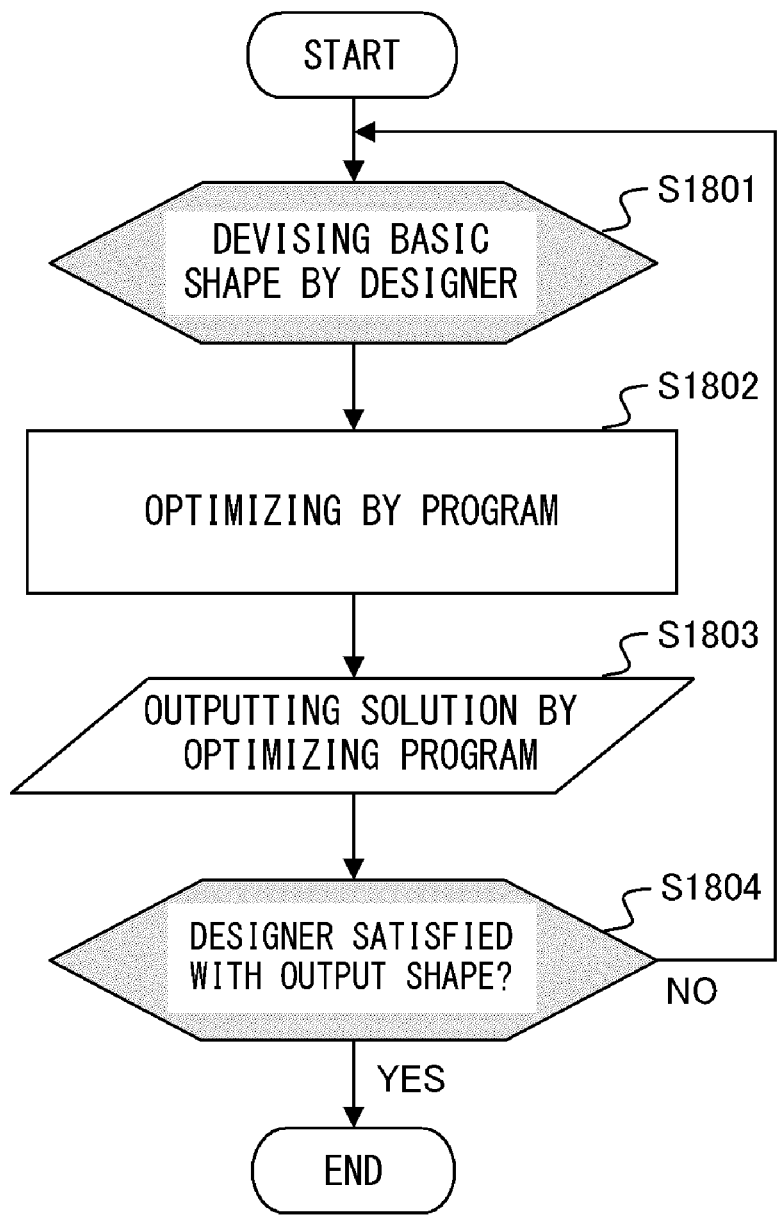
F I G. 1 8

OPTIMAL SOLUTION RELATION DISPLAY APPARATUS AND OPTIMAL SOLUTION RELATION DISPLAY METHOD

CROSS-REFERENCE TO RELATED APPLICATION

This application is based upon and claims the benefit of priority of the prior Japanese Patent Application No. 2008-226962, filed on Sep. 4, 2008, the entire contents of which are incorporated herein by reference.

FIELD

The embodiments discussed herein are related to multiobjective optimization design support technology used in designing.

BACKGROUND

With hard disks of higher density and larger capacity, the distance between a magnetic disk and a header becomes shorter, thereby requesting slider design with a smaller deviation of fly-height that would be caused by an elevation difference or a disk radial position.

As illustrated in FIG. 15 as a component assigned a reference numeral 1501, a slider is provided at the back of the tip of an actuator 1502 moving on a magnetic disk in a hard disk drive, and the position of the header is calculated by the shape of the slider 1501.

When the optimal shape of the slider 1501 is determined, the efficient calculation of so-called multiobjective optimization for simultaneously minimizing the functions relating to a fly-height (1503 in FIG. 15) that is associated with the position of the header, to a roll (1504) and to a pitch (1505) is to be performed.

More generally speaking, in a designing stage in manufacture, it is necessary to represent a design condition as one or more functions, that is, objective functions, relating to a design parameter (or design parameters), and to set a design parameter (or design parameters) for minimizing the objective functions, that is, to perform the optimization.

Conventionally performed is not directly solving a multiobjective optimization problem, but realizing single objective optimization by obtaining the minimum value of a linear sum f of terms, each of which is obtained by multiplying each objective function $f_j$ by a weight $k_j$ as represented by the following equation (1).

$$f = k_1 \cdot f_1 + k_2 \cdot f_2 + \ldots + k_t \cdot f_t \quad (1)$$

After a designer determines the basic shape, the respective domains of parameters p, q, r, etc. to define the slider shape S illustrated in FIG. 16 are set by a program. The function f is calculated over and over with the values of the parameters p, q, r, etc. gradually changed so that the slider shape can be calculated to minimize the function value f.

The function f depends on the weight vector $K=(k_1, k_2, \ldots, k_t)$. In the practical design, the minimum value of the function f with respect to each changed value is calculated while further changing the weight vector K. Then, by totally determining the balance between the calculated minimum value of the function f and the weight vector K, the slider shape is determined.

As described above, since there is a trade-off between functions in the multiobjective optimization including a plurality of objective functions, the number of calculated optimal solutions is not limited to one.

For example, if the optimization on the first objective function value is performed for "reducing a weight" as well as the optimization on the second objective function value is performed for "reducing a cost" in designing a product, the values of the first objective function and the second objective function can be various coordinate values in the two-dimensional coordinate system as illustrated in FIG. 17 depending on the manner of assigning a design parameter (or design parameters).

Since it is required that the values of both first objective function and the second objective function are small (namely, light weight and low cost is required), the points on a line 1703 connecting calculated points 1701-1, 1701-2, 1701-3, 1701-4, or 1701-5 in FIG. 17 and the points close to the line 1703 can be a group of optimal solutions.

As exemplified above, when there are a plurality of conditions such as the first objective function and the second objective function, the solution that can be a value satisfying an objective, at a higher level than another value does, in all objective functions and that can also be an apparently good value in one or more objectives is called a Pareto optimal solution or a non-dominated solution, and the boundary illustrated as the line 1703 in FIG. 17 is called a Pareto boundary. All non-dominated solutions can also be called solutions of multiobjective optimization.

In the calculated points 1701-1 through 1701-5 in FIG. 17, the calculated point 1701-1 corresponds to a model that costs high but can be light in weight, and the calculated point 1701-5 corresponds to a model that is not light in weight but costs low.

On the other hand, since the calculated points 1702-1 and 1702-2 are points corresponding to models that can be lighter in weight or cost lower, they cannot be optimal solutions. They are called dominated solutions.

Thus, in the multiobjective optimizing process, it is very important to be able to appropriately grasp non-dominated solutions (i.e., Pareto optimal solutions). To attain this, it is important to efficiently calculate non-dominated solutions for desired objective functions.

[Patent Document 1] Japanese Laid-open Patent Publication No. 07-44611

SUMMARY

Some aspects of the invention provide the apparatus, method, and program that support determining the optimal design parameter set.

The apparatus includes:
an objective function approximation unit configured
to receive input of a particular number of sample sets, wherein each sample set includes
a set of values of a plurality of design parameters and
a set of values of a plurality of objective functions calculated in advance corresponding to the values of the plurality of design parameters, and
to calculate a plurality of objective function approximating equations by approximating each of the plurality of objective functions by a mathematical equation;
an initial optimal design parameter set candidate selection unit configured to select, as candidates for an optimal design parameter set in an initial state, two or more from among sets of the values of the plurality of design parameters included in the sample sets, wherein the two or more correspond to non-dominated solutions in a cost evaluation for a pair of objective functions among the plurality of objective functions;
an interpolating design parameter set calculation unit configured to calculate, as one or more interpolating design parameter sets, one or more sets of values of the plurality of design parameters that interpolate between two adjacent components in the candidates;

an objective function calculation unit configured to approximate values of the plurality of objective functions using the plurality of objective function approximating equations for each of the calculated one or more interpolating design parameter sets;

an optimal interpolating design parameter set selection unit configured to select, as an optimal interpolating design parameter set, an interpolating design parameter set in the calculated one or more interpolating design parameter sets corresponding to a non-dominated solution in the cost evaluation for a pair of objective functions among the plurality of objective functions whose values have been approximated;

a process control unit configured
to perform integration of the optimal interpolating design parameter set into the candidates to define a result of the integration as new candidates,
to determine whether to perform a continuing process or to perform an output process by determining a parameter distance between components in the new candidates,
to input the new candidates into the interpolating design parameter set calculation unit and to return control to the interpolating design parameter set calculation unit when the continuing process is determined to perform, and
to output the new candidates as final optimal design parameter sets when the output process is determined to perform; and an optimal design parameter set relation information display unit configured to display information relating to the output final optimal design parameter sets.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a chart of the configuration of the block diagram of an embodiment of the present invention;

FIGS. 2A and 2B illustrate a flowchart of the operation of the process performed by an objective function approximation unit 102, an initial optimal design parameter set candidate selection unit 103, a constant parameter exclusion unit 104, and a slider transition relation calculation unit 105;

FIG. 3 is a chart (1) of the data configuration of sample sets 101 of values of design parameters and objective functions;

FIG. 4 is a chart (2) of the data configuration of sample sets 101 of values of design parameters and objective functions;

FIG. 6 is an explanatory view of the constant parameter exclusion unit 104;

FIGS. 7A and 7B are explanatory views (1) of the operation of the slider transition relation calculation unit 105;

FIG. 9 is an explanatory view of the operation of the Pareto boundary point calculating process;

FIG. 11 is an explanatory view (2) of the operation of the slider transition relation calculation unit 105;

FIG. 14 is an example of a hardware configuration of a computer capable of realizing a system according to an embodiment of the present invention;

FIG. 17 is an explanatory view of multiobjective optimization and non-dominated solutions; and FIG. 18 is a flowchart of an operation of the multiobjective optimization in a comparison example.

DESCRIPTION OF EMBODIMENTS

The embodiments of the present invention are described below in detail with reference to the attached drawings. First described is the problem to be solved by the embodiments of the present invention.

Figure 16:
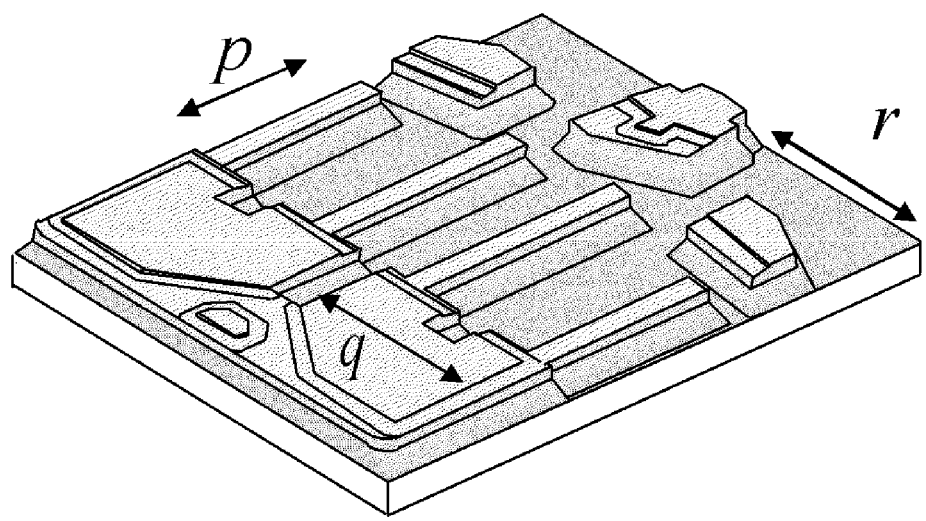
FIG. 16 is an explanatory view of parameters for a slider shape.

In the above-mentioned multiobjective optimization technology, the time-consuming levitation calculation is to be repeatedly performed. Specifically when a slider shape is searched in detail, the number of design parameters (corresponding to the parameters p, q, r, etc. illustrated in FIG. 16) is about 15, thereby requiring more than ten thousand times of levitation calculation. One levitation calculation process requires a long period of time and is performed by using a simulator. Therefore, there is the problem that the multiobjective optimization calculation takes a very long time.

In addition, in the above-mentioned method related to the equation (1), the minimum value of f (and the values of the design parameters that minimize the value of f) depends on the determination of the weight vector $K=(k_1, k_2, \ldots, k_r)$. In practical designing, there frequently occurs the situation in which f is to be optimized for various weight vectors respectively to compare the optimized values of f each other. However, since it is needed, in the technology above, to perform again from the beginning of the optimizing calculation with a costly levitation calculation each time the weight vector is changed, there is the restriction on the types of a weight vector that can be experimentally tested.

In addition, since one point each on the Pareto boundary is obtained at a time in optimizing the value of the function f, it is hard to estimate the optimal relation among objective functions. Besides such a problem, there is another problem that the information about the optimal relation among the objective functions cannot be fed back to a designing operation.

When one point is obtained as an optimal solution on the Pareto boundary in the multiobjective optimization, a set of design parameters is determined for the obtained point and one design shape is obtained for the obtained point. However, the designer is not necessarily satisfied with the obtained design shape.

Therefore, a method can be employed that finally makes decision after obtaining a plurality of non-dominated solutions by running an optimizing program several times and comparing and checking the obtained non-dominated solutions. As a comparison example compared to the embodiment of the present invention, the method is described below with reference to FIG. 18.

In the comparison example, the designer first devises a basic shape (step S1801) as illustrated in FIG. 18, performs the optimization using a program (step S1802), and when the optimizing program outputs one non-dominated solution (step S1803), the designer determines whether or not the output shape corresponding to the non-dominated solution satisfies the designer (step S1804). If the designer is not satisfied with the output shape, a new basic shape is devised again (step S1801), and the optimization is performed (steps S1802 through S1804), thus repeating the operations.

In this case, in the comparison example, since the multi-objective optimization process per se takes a very long time, it is hard to appropriately calculate a non-dominated solution. In addition, there is no design supporting method of efficiently repeating the optimization while determining the design shape etc. on the basis of a non-dominated solution.

Especially, when there are, for example, two sets of design parameters known to be as two non-dominated solutions, there can often be the case where a consideration is to be made while gradually changing the shape among the design shapes corresponding to each design parameter set. However, when respective values of a plurality of design parameters included in the design parameter set are gradually changed between the two design parameter sets as non-dominated solutions, the design parameter set obtained by each change is not necessarily a non-dominated solution.

Therefore, it is necessary to perform an optimizing calculation on the design parameter set obtained by each change. In the comparison example, it is very hard to efficiently perform the above-mentioned process.

The embodiment of the present invention described below in detail is to solve the above-mentioned problem not solved in the comparison example above. For simplicity of notation, the phrases such as "value of XXX" and "set of YYYs" may be hereinafter denoted as "XXX value" and "YYY set", respectively.

FIG. 1 is a chart of the configuration of the block diagram of an embodiment of the present invention. With respect to sample sets 101 of values of design parameters and objective functions, the objective function approximation unit 102 approximates each objective function related to a slider shape by a polynomial such as a multiple regression equation based on a multiple regression analysis.

The sample sets 101 of values of design parameters and objective functions include at most several hundreds of sample sets empirically pre-obtained by simulator calculations; where each sample set is configured by a set of values of plural design parameters and a set of values of plural objective functions calculated by simulator calculations using the set of values of plural design parameters.

Although an example of approximation on the basis of the multiple regression analysis is described in the present embodiment, general polynomial approximating methods, such as various polynomial interpolating methods or the approximation with the order of the polynomial increased, can also be used.

A Pareto boundary point calculation unit 110 detects a point on the Pareto boundary in an objective function space defined by any two objective functions using an objective function polynomial obtained by the objective function approximation unit 102. The result is referred to by the slider transition relation calculation unit 105.

The constant parameter exclusion unit 104 excludes a design parameter (or design parameters) indicating a small change from a calculating process to efficiently performing the calculating process according to the present embodiment.

The slider transition relation calculation unit 105 performs the following calculation on, for example, two sample sets known to provide non-dominated solutions and selected from the sample sets 101 of values of design parameters and objective functions.

That is, the slider transition relation calculation unit 105 calculates as the optimal design parameter set on the basis of the approximation of objective functions a non-dominated solution from among the design parameter sets obtained by each change gradually made on plural design parameter values included in each selected sample set. Thus, the slider transition relation calculation unit 105 calculates the transition of the design parameter sets between, for example, two sets of design parameter values respectively in the selected sample sets corresponding to two slider shapes.

To be more concrete, the slider transition relation calculation unit 105 is configured by an interpolating design parameter set calculation unit 105-1, an objective function calculation unit 105-2, an optimal interpolating design parameter set selection unit 105-3, and a process control unit 105-4.

The interpolating design parameter set calculation unit 105-1 calculates, as one or more interpolating design parameter sets, one or more design parameter sets that interpolate between design parameter sets adjacent each other in the input initial candidates for the optimal design parameter set. As would be understood by those skilled in the art, herein the term "interpolating design parameter set" or "design parameter set" are used, for simplicity of notation, to denote a set of interpolating values of design parameters.

The objective function calculation unit 105-2 approximates the values of a plurality of objective functions using a plurality of objective function approximating equations obtained by the objective function approximation unit 102 on each of the one or more calculated interpolating design parameter sets.

The optimal interpolating design parameter set selection unit 105-3 selects, as one or more optimal interpolating design parameter sets, one or more interpolating design parameter sets, if any, respectively corresponding to the one or more non-dominated solutions from among the existing interpolating design parameter sets that have been calculated; where the non-dominated solutions herein are those in the cost evaluation of pairs of objective functions among the plurality of objective functions whose values have been approximately calculated.

The process control unit 105-4 integrates the one or more optimal interpolating design parameter sets into candidates for the optimal design parameter set and defines the result as new candidates for the optimal design parameter set. Then, the process control unit 105-4 determines whether to perform the continuing process or to perform the output process by determining the parameter distance between the design parameter sets configuring thus obtained new candidates for the optimal design parameter set.

When the process control unit 105-4 determines to perform the continuing process, it inputs the new candidates for the optimal design parameter set to the interpolating design parameter set calculation unit 105-1 to which control is returned. When the process control unit 105-4 determines to perform the output process, it outputs the new candidates for the optimal design parameter set as final optimal design parameter sets.

A transition data storage unit 106 stores gradually changing optimal design parameter sets calculated by the slider transition relation calculation unit 105.

A slider shape generation unit 107 calculates each slider shape corresponding to each of the gradually changing optimal design parameter sets stored in the transition data storage unit 106, and causes an optimal design parameter set relation information display unit 109 to display each slider shape.

A direction vector generation unit 108 generates a direction vector indicating the change of the design parameter values between the adjacent ones in the gradually changing optimal design parameter sets stored in the transition data storage unit 106, and causes the optimal design parameter set relation information display unit 109 to display the generated direction vector.

Described below is the operation with the above-mentioned configuration according to the present embodiment.

Figure 2B:
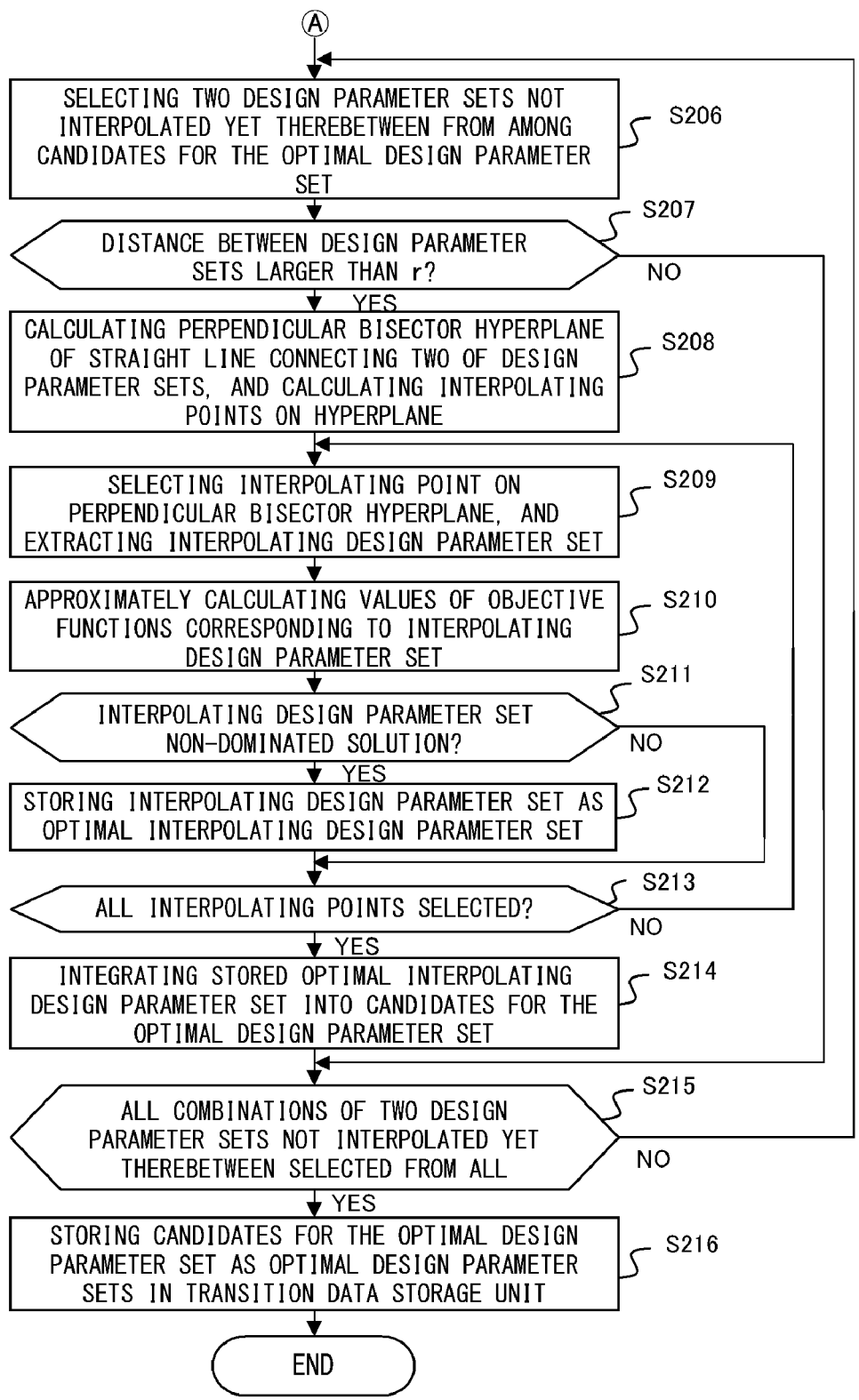

FIGS. 2A and 2B illustrate a flowchart of the operation of the process performed by the objective function approximation unit 102, the initial optimal design parameter set candidate selection unit 103, the constant parameter exclusion unit 104, and the slider transition relation calculation unit 105 illustrated in FIG. 1. In the description below the reference numerals 101 through 110 indicate the respective components illustrated in FIG. 1, and steps S201 through S216 indicate the respective processes illustrated in FIG. 2A.

First, the sample sets 101 of values of design parameters and objective functions having the data file configuration as illustrated in FIGS. 3 and 4 are input (step S201).

In FIG. 3, the values in each column expressed by labels "x1" (column B) through "x8" (column I) or in a column omitted in FIG. 3 are the values of design parameters, and the values in the column expressed by a label "cost2" (column A) are the values of an objective function. A design parameter set is configured by, for example, 15 design parameters $x_1$ through $x_{15}$. Each value of design parameter $x_i$ ($1 \leq i \leq 15$) is normalized into $0 \leq x_i \leq 1$.

In FIG. 4, the values in the columns B through K are values of the respective objective functions, and each of the values in the column A is the value of linear sum of each objective function calculated by the equation (1) above.

Next, using the data file of the sample sets 101 of values of design parameters and objective functions, the objective function approximation unit 102 approximates each objective function relating to the slider shape by the polynomial such as the multiple regression equation based on a multiple regression analysis (step S202).

As a result, polynomials of the objective functions as exemplified by the equation (2) below are obtained.

$$f_1 := 99.0424978610709132 - 6.83556672325811121 \cdot x_1 + \quad (2)$$
$$14.0478279657713188 \cdot x_2 - 18.6265540605823148 \cdot x_3 -$$
$$28.3737252180449389 \cdot x_4 - 2.42724827545463118 \cdot x_5 +$$
$$36.9188200131846998 \cdot x_6 - 46.7620704128296296 \cdot x_7 +$$
$$1.05958887094079946 \cdot x_8 + 6.50858043416747911 \cdot x_9 -$$
$$1.3181110745759242 \cdot x_{10} - 6.35438297722882960 \cdot x_{11} +$$
$$4.85313298773917622 \cdot x_{12} - 11.142898807281405 \cdot x_{13} +$$
$$35.3305897914634315 \cdot x_{14} - 53.2729720194943113 \cdot x_{15};$$

The objective function is generally expressed by $f_j(x_i)$ ($1 \leq j \leq t$, $1 \leq i \leq m$). In this example, t indicates the number of objective functions, and m indicates the number of design parameters. In the example by the equation (2) above, m is 15 (m=15).

As described above, according to the present embodiment, objective functions polynomially approximated by multiple regression equations etc. can be obtained by using the sample sets 101 of values of design parameters and objective functions that include at most some hundreds of sample sets. Objective functions can be polynomially approximated on the basis of the following information.

That is, in slider designing, there is provided the initial shape of a slider, and the optimization is performed while changing design parameters for determining the initial shape within a specified range. Therefore, in the optimization within such a local design changing range, fully effective initial optimization can be performed by, for example, linear approximation based on a multiple regression equation.

Figure 5:
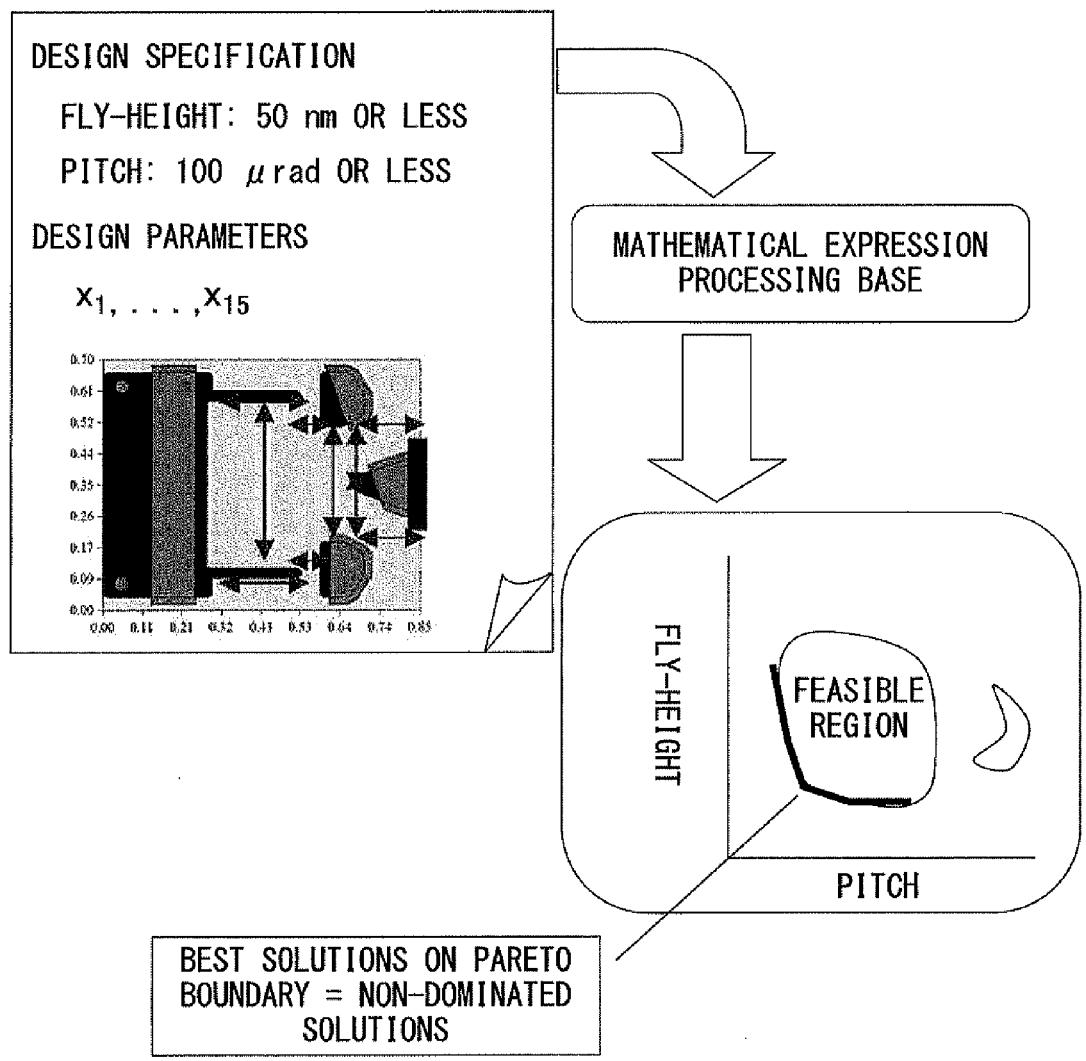
FIG. 5 is an explanatory view that explains the merit of feasible region display on the basis of the mathematical expression processing.

In the present embodiment, the objective functions thus calculated and processed as the mathematical equations are used in deriving a non-dominated solution in calculating the transition of the slider shape as described below, thereby realizing a very efficient design supporting system. That is, in the present embodiment, the multiobjective optimization process can be performed on the basis of the mathematical expression processing by a polynomial approximation as illustrated in FIG. 5, and a non-dominated solution on a Pareto boundary can be calculated by simple equations.

Next, the Pareto boundary point calculation unit 110 calculates a Pareto boundary (step S203). The process is described later.

Then, the initial optimal design parameter set candidate selection unit 103 allows the designer to specify two sample sets at both ends of transition in considering the transition of the slider shape; for more details, it allows the designer to specify the two sample sets from among the input sample sets 101 of values of design parameters and objective functions as two initial candidates for the optimal design parameter set, and it allows the designer to specify the two sample sets through the input device not illustrated in the attached drawings (step S204). The specified two sample sets are hereinafter denoted by L=[$A_1$, $A_2$].

Next, the constant parameter exclusion unit 104 makes comparison of the value of each design parameter between sample sets in the initial candidates L=[$A_1$, $A_2$] for the optimal design parameter set. And then, the constant parameter exclusion unit 104 fixes an unchanged design parameter or a design parameter indicating a change within a predetermined threshold with its current value (step S205).

For instance, in the example illustrated in FIG. 6, in the initial candidates L=[$A_1$, $A_2$] for the optimal design parameter set, the value 0.3 of the design parameter $x_2$ and the value 0.8 of the design parameter $x_{14}$ are fixed in the following calculating process, and excluded from the calculation.

Next, the slider transition relation calculation unit 105 selects two design parameter sets A and B between which interpolation has not yet been performed. The selection is made from among the current candidates L for the optimal design parameter set (step S206). Since L=[$A_1$, $A_2$] in the initial state, A=$A_1$, and B=$A_2$.

Next, the slider transition relation calculation unit 105 calculates the Euclidean distance between the selected candidates A and B for the optimal design parameter set, and determines whether or not the distance is larger than the predetermined threshold r (step S207) The threshold r defines the step-size of the transition of the slider shape.

When the Euclidean distance between the selected candidates A and B for the optimal design parameter set is equal to or less than the threshold r, the slider transition relation calculation unit 105 enters the process of selecting another combination of two sets without further performing the interpolation between the two design parameter sets A and B (step S207 to step S215).

When the Euclidean distance between the selected candidates A and B for the optimal design parameter set is larger than the threshold r (YES in the determination in step S207) the process control unit 105-4 in the slider transition relation calculation unit 105 performs a series of processes in steps S208 through S214 described below.

First, the interpolating design parameter set calculation unit 105-1 in the slider transition relation calculation unit 105 calculates, in the design parameter space whose coordinate axes are defined by the design parameters configuring a design parameter set, a perpendicular bisector hyperplane of the straight line connecting points with the coordinates indicated by the two candidates A and B for the optimal design parameter sets selected in step S206 (step S208).

FIG. 7A is an explanatory view of the case when it is assumed that the design parameter space determined by a design parameter set $\{x_i\}$ ($1 \leq i \leq m$) is two-dimensional (m=2) for easy understanding. In the initial state, the perpendicular bisector hyperplane of a straight line 701 connecting points with the coordinates indicated by two candidates A and B for the optimal design parameter sets is indicated by P in FIG. 7A.

The P is a straight line when the design parameter space is two-dimensional, a plane when it is three-dimensional, and a hyperplane when it is four-dimensional or more. Generally when a design parameter space is m-dimensional, P is (m−1)-dimensional perpendicular bisector hyperplane, and when the design parameter sets A and B are denoted as $A=(a_1, \ldots, a_m)$, and $B=(b_1, \ldots, b_m)$, the perpendicular bisector hyperplane P is represented by the following equation (3).

$$(a_1-b_1)\cdot x_1 + \ldots + (a_m-b_m)\cdot x_m = (a_1^2 + \ldots + a_m^2 - b_1^2 - \ldots - b_m^2)/2 \quad (3)$$

Then, the interpolating design parameter set calculation unit 105-1 calculates a plurality of interpolating points on the perpendicular bisector hyperplane P in the design parameter space (step S208). Practically, for example, with design parameter coordinate values of the first through (m−1)-th dimension corresponding to the intersection of P and the straight line 701 as the center, lattice points are obtained and set. Each lattice point is obtained by increasing or decreasing, by a predetermined step-size, the coordinate value $x_i$ ($1 \leq i \leq m-1$) of each design parameter of the first through (m−1)-th dimension, respectively, within a predetermined range.

Then, for each one lattice point, by substituting its coordinate values $(x_1, x_2, \ldots, x_{m-1})$ of the first through (m−1)-th dimension into the above-mentioned equation (3), the remaining coordinate value $x_m$ of the m-th dimension is calculated. Then, as the resultant coordinate values $(x_1, x_2, \ldots, x_{m-1}, x_m)$ of the first to m-th dimension, an interpolating point is obtained on the above-mentioned perpendicular bisector hyperplane P. The set of coordinate values $\{x_i\}$ ($1 \leq i \leq m$) is an interpolating design parameter set corresponding to the interpolating point determined as above.

By performing the above-explained process on all lattice points, a plurality of interpolating points can be calculated. In the example illustrated in FIG. 7A, the interpolating points $C_1, C_2, \ldots, C_{q-1}, C_q$ are calculated on the perpendicular bisector hyperplane.

Next, a series of looped processing is repeatedly performed in steps S209 through S213 until it is determined in step S213 illustrated in FIG. 2B that all interpolating points have been selected while the interpolating design parameter set calculation unit 105-1 is selecting each point from among the interpolating points in step S209.

That is, the interpolating design parameter set calculation unit 105-1 first selects one point from among the plurality of interpolating points calculated in step S208, and extracts one interpolating design parameter set $\{x_i\}$ ($1 \leq i \leq m$) indicated as coordinate values of the selected point (step S209).

Next, the objective function calculation unit 105-2 in the slider transition relation calculation unit 105 approximately calculates the number t of values of objective functions $f_j(x_i)$ ($1 \leq j \leq t$, $1 \leq i \leq m$). The calculation is based on the number t of objective function approximating equations calculated in step S202 and is performed by using the extracted one interpolating design parameter set $\{x_i\}$ (step S210).

Next, the optimal interpolating design parameter set selection unit 105-3 in the slider transition relation calculation unit 105 determines whether or not a point indicated by the values of the objective functions $f_j(x_i)$ calculated for the current interpolating design parameter set $\{x_i\}$ is located on or near the Pareto boundary in the objective function space. That is, the optimal interpolating design parameter set selection unit 105-3 determines whether or not the interpolating design parameter set $\{x_i\}$ is a non-dominated solution (step S211).

Suppose that the values of two arbitrarily selected objective functions $f_u$ and $f_v$ in the number t of values of the objective functions $f_j(x_i)$ calculated for the current interpolating design parameter set $\{x_i\}$ are plotted in the objective function space defined by $f_u$ and $f_v$. If the interpolating design parameter set $\{x_i\}$ is a non-dominated solution, then the values of $f_u$ and $f_v$ are plotted near a Pareto boundary 702 illustrated in FIG. 7B.

In FIG. 7B, since interpolating points $C_1$, $C_2$, and $C_q$ are plotted near the Pareto boundary 702, there is a strong possibility that the interpolating design parameter sets corresponding to these interpolating points $C_1$, $C_2$, and $C_q$ are non-dominated solutions. On the other hand, since the interpolating point $C_{q-1}$ is plotted apart from the Pareto boundary 702, it can be determined that the interpolating design parameter set corresponding to the interpolating point $C_{q-1}$ is not a non-dominated solution.

Accordingly, if all points respectively defined by the respective pairs of values of objective functions in all combinations of two values of objective functions $f_u$ and $f_v$ selected from the number t of values of the objective functions $f_j(x_i)$ calculated for the current interpolating design parameter set $\{x_i\}$ are plotted on or near the Pareto boundary in the respective objective function spaces corresponding to the respective pairs, then it can be determined that the current interpolating design parameter set $\{x_i\}$ is a non-dominated solution. The details of the determining process are described below.

Figure 8:
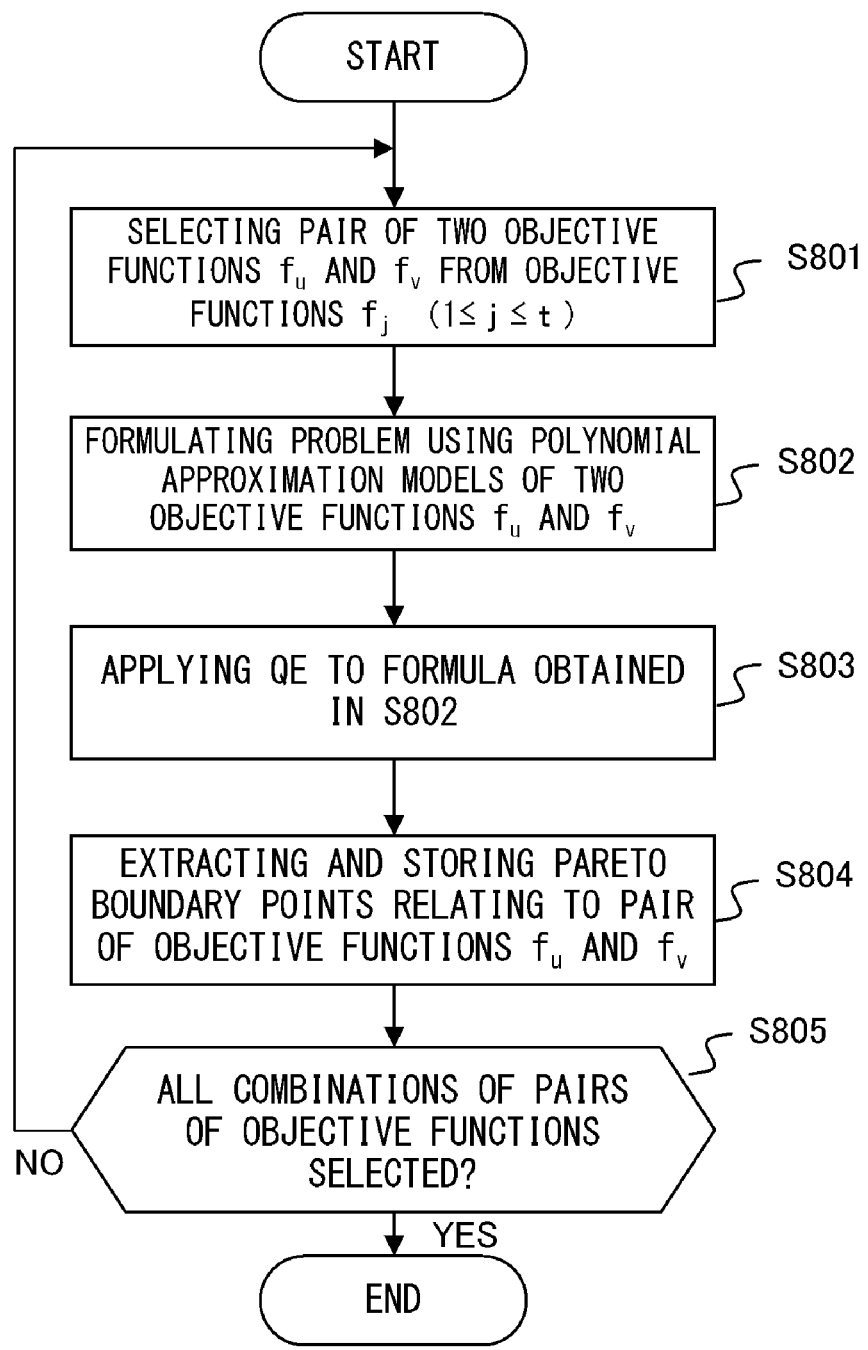
FIG. 8 is a flowchart of the detailed operation of a Pareto boundary point calculating process.

First, to realize the determining process, the Pareto boundary point calculation unit 110 performs the Pareto boundary point calculating process (step S203) immediately after the process by the objective function approximation unit 102 in step S202 illustrated in FIG. 2A. FIG. 8 is a flowchart of the detailed operation of the Pareto boundary point calculating process in step S203. In the following description, steps S801 through S805 are the processes illustrated in FIG. 8.

First, the Pareto boundary point calculation unit 110 selects a pair of arbitrary objective functions $f_u$ and $f_v$ from among the number t of objective functions $f_j$ (step S801).

Next, the Pareto boundary point calculation unit 110 generates a formula for the two objective functions selected in step S801 using respective polynomials approximating the respective objective functions calculated by the objective function approximation unit 102 and also using the respective constraint conditions on the respective values of design parameters in the sample sets 101 of values of design parameters and objective functions (step S802).

Thus, for example, the formulas exemplified as the following formulas (4a) and (4b) are obtained.

$$y_1 = f_u(x_1, \ldots, x_{15}), y_2 = f_v(x_1, \ldots, x_{15}) \quad (4a)$$

where the design parameters $x_1, \ldots, x_{15}$ vary in the range of $0 \leq x_i \leq 1$ ($1 \leq i \leq 15$).

$$F := \exists x_1 \exists x_2 \ldots \exists x_{15};$$

$$0 \leq x_1 \leq 1 \text{ and } 0 \leq x_2 \leq 1 \text{ and } \ldots \text{ and } 0 \leq x_{15} \leq 1 \text{ and } y_1 = f_u(x_1, \ldots, x_{15}) \text{ and } y_2 = f_v(x_1, \ldots, x_{15}) \quad (4b)$$

Next, the Pareto boundary point calculation unit 110 calculates a logical formula indicating relationship between the two objective functions selected in step S801 by the QE (quantifier elimination) method using the logical formula F formulated as the formula (4b) above (step S803). As a result, the design parameters $x_1, \ldots, x_{15}$ are eliminated as exemplified by the following formula (5), and the logical formula relating to the two objective functions $y_1$ and $y_2$ is output.

$$y_2 < y_1 + 1 \text{ and } y_2 > 2 \text{ and } y_2 > 2 \cdot y_1 - 3 \quad (5)$$

The details of the QE method are omitted here, but the processing method is disclosed by the non-patent document "Introduction to Computational Real Algebraic Geometry: Overview of CAD and QE" (Sugaku Seminar, No. 11, 2007, pp. 64-70) by Hirokazu Anai, Kazuhiro Yokoyama, and the processing method is used as is in the present embodiment.

Next, the Pareto boundary point calculation unit 110 extracts and stores the Pareto boundary points relating to the pair of objective functions $f_u$ and $f_v$ on the basis of the logical formula that is calculated in step S803 and that indicates relationship between the two arbitrary objective functions (step S804).

Assume that the polynomials respectively approximating the two objective functions $f_u$ and $f_v$ in the pair are configured on the basis of three input parameters $x_1, x_2, x_3$ as exemplified by the following equations (6a) and (6b) for easy understanding.

$$y_1 = f_u(x_1, x_2, x_3) = x_1 - 2 \cdot x_2 + 3 \cdot x_3 + 6 \quad (6a)$$

$$y_2 = f_v(x_1, x_2, x_3) = 2 \cdot x_1 + 3 \cdot x_2 - x_3 + 5 \quad (6b)$$

The result of generating a formula in step S802 for the equations (6a) and (6b) is expressed by the following formula (7).

$$F := \exists x_1 \exists x_2 \exists x_3;$$

$$0 \leq x_1 \leq 1 \text{ and } 0 \leq x_2 \leq 1 \text{ and } 0 \leq x_3 \leq 1 \text{ and } y_1 = x_1 - 2 \cdot x_2 + 3 \cdot x_3 + 6 \text{ and } y_2 = 2 \cdot x_1 + 3 \cdot x_2 - x_3 + 5 \quad (7)$$

The result of applying the QE method in step S803 to the formula (7) above is expressed by the following formula (8).

$$(3 \cdot y_1 + 2 \cdot y_2 - 35 \geq 0 \text{ and } 3 \cdot y_1 + 2 \cdot y_2 - 42 \leq 0 \text{ and } y_1 + 3 \cdot y_2 - 28 \geq 0 \text{ and } y_1 + 3 \cdot y_2 - 35 \leq 0) \text{ or } (3 \cdot y_1 + 2 \cdot y_2 - 28 \geq 0 \text{ and } 3 \cdot y_1 + 2 \cdot y_2 - 35 \leq 0 \text{ and } 2 \cdot y_1 - y_2 - 7 \leq 0 \text{ and } 2 \cdot y_1 - y_2 \geq 0) \text{ or } (2 \cdot y_1 - y_2 - 7 \geq 0 \text{ and } 2 \cdot y_1 - y_2 - 14 \leq 0 \text{ and } y_1 + 3 \cdot y_2 - 21 \geq 0 \text{ and } y_1 + 3 \cdot y_2 - 28 \leq 0) \quad (8)$$

In the two-dimensional objective function space relating to the two objective functions $y_1$ and $y_2$ exemplified by the formula (8), the points, for which the logical formula about the two objective functions $y_1$ and $y_2$ as formulated in the formula (8) is true, are painted while each point on the coordinate plane is swept. Then, for example, the area painted as an area 900 illustrated in FIG. 9 is obtained. The painted area is referred to as a "feasible region". In FIG. 9, the diagonal straight lines on the $y_1$-$y_2$ coordinate plane indicate respective logical boundaries of constituent logical formulas included in the formula (8).

As displayed in FIG. 9, in a feasible region 900, the Pareto boundary relating to the two objective functions $f_u$ and $f_v$ (namely, $y_1$ and $y_2$) can be easily recognized by intuition as the boundary of the lower edge portion near the origin of the coordinate system, and the marginal area of the optimization can be recognized.

To identify the Pareto boundary, the Pareto boundary point calculation unit 110 operates as follows (step S804). The Pareto boundary point calculation unit 110 increases the value of the objective function $f_v$ by a predetermined step-size from 0 in the direction of an arrow 901. For each value of objective function $f_v$, the Pareto boundary point calculation unit 110 increases the value of the objective function $f_u$ by a predetermined step-size from 0 in the direction of an arrow 902. While sweeping a search point as stated above, the Pareto boundary point calculation unit 110 extracts points on a Pareto boundary and stores the points.

Herein, each of the points (903 etc. in FIG. 9) to be extracted is such a point that makes the logical formula (such as formula (5) or (8)) about the two objective functions $f_u$ and $f_v$ true first during a sweep in the direction of the arrow 902 and that makes the increase rate of $f_u$ with respect to the increase of $f_v$ negative (namely, that has the value of $f_u$ less than the value of $f_u$ at another point that has been extracted previously in a sweep in the direction of the arrow 901).

As a result, relating to the two currently selected objective functions $f_u$ and $f_v$ (namely, $y_1$ and $y_2$), a plurality of Pareto boundary points as displayed in FIG. 9 can be extracted.

After the process in step S804 is completed, the Pareto boundary point calculation unit 110 determines whether or not all combinations of pairs of the objective functions $f_u$ and $f_v$ have been selected from among the number t of objective functions $f_j$ (step S805).

If all pairs of the objective functions $f_u$ and $f_v$ have not been selected, the Pareto boundary point calculation unit 110 returns control to the process in step S801, selects the next pair of the objective functions $f_u$ and $f_v$, and extracts a Pareto boundary for the selected pair in steps S802 through S804.

If all pairs of the objective functions $f_u$ and $f_v$ have been selected, the Pareto boundary point calculation unit 110 determines YES in step S805, and terminates the process of the operations in the flowchart in FIG. 8, that is, the Pareto boundary point calculating process in step S203 in FIG. 2A.

In the above-mentioned Pareto boundary point calculating process, the multiobjective optimizing process can be performed on the basis of the mathematical expression processing by polynomial approximation, and Pareto boundary points can be easily calculated using a logical formula on the basis of the QE method for each combination of objective functions, though such calculation of Pareto boundary points has conventionally been difficult.

Using the Pareto boundary points calculated for each pair of objective functions by the Pareto boundary point calculation unit 110 as described above, the optimal interpolating design parameter set selection unit 105-3 in the slider transition relation calculation unit 105 performs the following determination in step S211.

That is, the optimal interpolating design parameter set selection unit 105-3 determines whether or not the values of the objective functions $f_j(x_i)$ calculated for the current interpolating design parameter set $\{x_i\}$ locate a point on or near the Pareto boundary in the objective function space. That is, the optimal interpolating design parameter set selection unit 105-3 determines whether or not the current interpolating design parameter set $\{x_i\}$ is a non-dominated solution.

Figure 10:
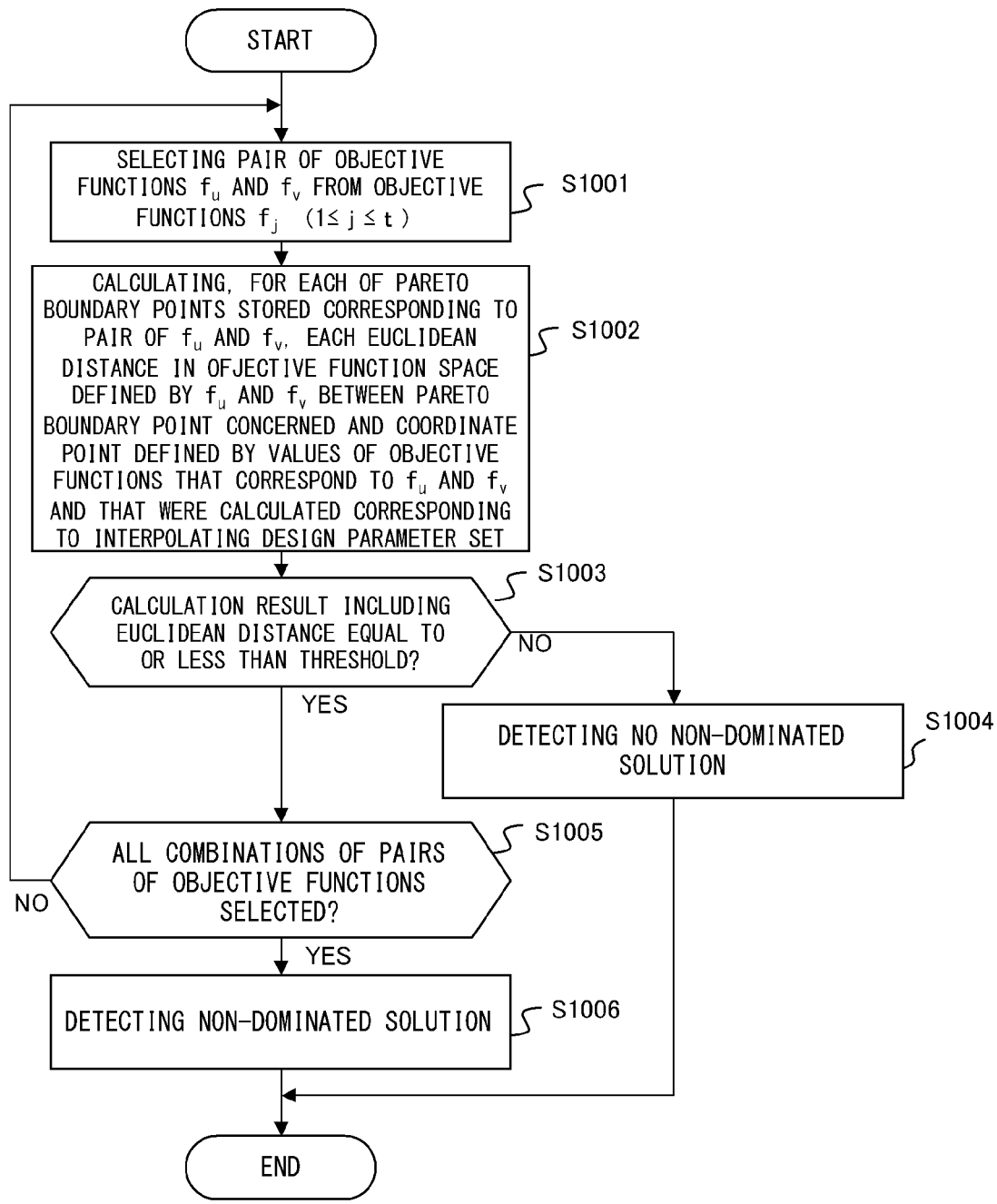
FIG. 10 is a flowchart of the operation of a non-dominated solution determining process.

FIG. 10 is a flowchart of the operation of the detailed process in step S211. In the description below, the processes in steps S1001 through S1006 are illustrated in FIG. 10.

First, the optimal interpolating design parameter set selection unit 105-3 selects an arbitrary pair of objective functions $f_u$ and $f_v$ from among the number t of objective functions $f_j$ (step S1001).

Next, the optimal interpolating design parameter set selection unit 105-3 calculates, for each of the Pareto boundary points corresponding to a pair of $f_u$ and $f_v$, the Euclidean distance in the objective function space defined by $f_u$ and $f_v$ between the Pareto boundary point concerned and the coordinate point defined by the values of objective functions corresponding to $f_u$ and $f_v$ (step S1002). The coordinate point defined by the values of objective functions corresponding to $f_u$ and $f_v$ is calculated in step S210 corresponding to the current interpolating design parameter set. Each of the Pareto boundary points corresponding to the pair of $f_u$ and $f_v$ is extracted and stored by the Pareto boundary point calculation unit 110 in step S203.

Next, the optimal interpolating design parameter set selection unit 105-3 determines whether or not there is a value equal to or smaller than a predetermined threshold in the Euclidean distances calculated in step S1002. That is, the optimal interpolating design parameter set selection unit 105-3 determines whether or not the above-mentioned coordinate point is located near any of the Pareto boundary points extracted corresponding to the pair of $f_u$ and $f_v$ (step S1003).

When all of the Euclidean distances calculated in step S1002 are larger than the predetermined threshold, it can be determined that the coordinate point is not located on the Pareto boundary corresponding to the pair of $f_u$ and $f_v$. Therefore, the optimal interpolating design parameter set selection unit 105-3 immediately outputs that a non-dominated solution is not detected (steps S1003 and S1004), and terminates the process of the operation in the flowchart illustrated in FIG. 10, that is, the process in step S211 illustrated in FIG. 2B.

When any of the Euclidean distances calculated in step S1002 is equal to or smaller than the predetermined threshold, it can be determined that the coordinate point is located on the Pareto boundary corresponding to the pair of $f_u$ and $f_v$. Therefore, the optimal interpolating design parameter set selection unit 105-3 determines whether or not all combinations of pairs of objective functions $f_u$ and $f_v$ have been selected from among the number t of objective functions $f_j$ (step S1005).

If the optimal interpolating design parameter set selection unit 105-3 has not selected all combinations of pairs of objective functions $f_u$ and $f_v$, control is returned to step S1001. Then, the optimal interpolating design parameter set selection unit 105-3 selects the next pair of objective functions $f_u$ and $f_v$, and performs determination on the Pareto boundary for the pair in steps S1002 through S1004.

When all combinations of pairs of objective functions $f_u$ and $f_v$ have been selected, and the determination in step S1005 is YES, the following determination can be made. That is, it can be determined that, in all objective function spaces defined by any pair of objective functions $f_u$ and $f_v$, the coordinate point defined by the values of objective functions corresponding to $f_u$ and $f_v$ calculated by the current interpolating design parameter set is located on the Pareto boundary corresponding to the pair of $f_u$ and $f_v$.

Therefore, when the determination in step S1005 is YES, the optimal interpolating design parameter set selection unit 105-3 outputs that a non-dominated solution is detected (steps S1005 through S1006). Then, the optimal interpolating design parameter set selection unit 105-3 terminates the process of the operation in the flowchart in FIG. 10, that is, the process in step S211 in FIG. 2B.

As described above, the optimal interpolating design parameter set selection unit 105-3 can determine in step S211 illustrated in FIG. 2B whether or not the value of objective functions $f_j(x_i)$ calculated for the current interpolating design parameter set $\{x_i\}$ locate a point on or near the Pareto boundary in the objective function space. That is, the optimal interpolating design parameter set selection unit 105-3 can determine whether or not the interpolating design parameter set $\{x_i\}$ is a non-dominated solution.

Back in the process in FIG. 2B, when the optimal interpolating design parameter set selection unit 105-3 determines that the current interpolating design parameter set $\{x_i\}$ is a non-dominated solution, the current interpolating design parameter set $\{x_i\}$ is stored as an optimal interpolating design parameter set. (steps S211 through S212).

When the optimal interpolating design parameter set selection unit 105-3 determines that the current interpolating design parameter set $\{x_i\}$ is not a non-dominated solution, the current interpolating design parameter set $\{x_i\}$ is discarded (the flow from step S211 to step S213).

When the determination in step S211 is NO, or after the process in step S212, it is determined whether or not all interpolating points calculated on the perpendicular bisector hyperplane P in step S208 have been selected (step S213).

When it is determined by the slider transition relation calculation unit 105 that not all interpolating points have been selected, control is returned to the process in step S209. Then, a new interpolating point on the perpendicular bisector hyperplane P is selected, and then in a series of processes in steps S210 through S212, it is determined whether or not an interpolating design parameter set $\{x_i\}$ corresponding to the newly selected interpolating point is a non-dominated solution. If the interpolating design parameter set $\{x_i\}$ is a non-dominated solution, it is stored as an optimal interpolating design parameter set. The above-mentioned processes are repeatedly performed.

By the repeated processes in steps S209 through S213 as mentioned-above, for example, it is determined whether or not each of the interpolating points $C_1, C_2, \ldots, C_{q-1}, C_q$ on the perpendicular bisector hyperplane P illustrated in FIG. 7A is located on the Pareto boundary 702 in the objective function space as conceptually illustrated in FIG. 7B, and respective interpolating design parameter sets of interpolating points ($C_1$, $C_2$, and $C_q$ in FIG. 7B) located on the Pareto boundary 702 are extracted as optimal interpolating design parameter sets.

If it is determined that all interpolating points have been selected, the process control unit 105-4 in the slider transition relation calculation unit 105 performs the following process in step S214. That is, the process control unit 105-4 integrates the sequentially stored one or more optimal interpolating design parameter sets into the current candidates L for the optimal design parameter set (steps S213 through S214).

Assume that the optimal interpolating design parameter sets stored in step S212 are denoted by $T=\{T_1, T_2, \ldots, T_d\}$ as illustrated in FIG. 11. Since the candidates for the optimal design parameter sets are denoted by $L=[A_1, A_2]$ in the initial state, below-exemplified candidates for the optimal design parameter set are generated in the integrating process in step S214, where the generated candidates are denoted by L' and configured by the number d of paths.

For example, when d=3, the candidates L' for the optimal design parameter set is listed below.

$L'=[A_1,T_1,A_2]$, $[A_1,T_2,A_2]$, $[A_1,T_3,A_2]$

Next, the process control unit 105-4 substitutes, for new candidates L for the optimal design parameter set, one of the paths in the candidates L' for the optimal design parameter set generated as described above; for example, substituting $[A_1, T_1, A_2]$ for L. Then, the process control unit 105-4 determines whether or not all combinations two design parameter sets between which interpolation has not yet been performed have been selected from the replaced candidates L for the optimal design parameter set (step S215). The determination is performed on all paths.

If not all combinations of two design parameter sets A and B not yet interpolated therebetween have been selected by the process control unit 105-4 from the components of the candidates L for the optimal design parameter set, then control is returned to step S206. Then, the process control unit 105-4 newly selects a pair of design parameter sets A and B not yet interpolated therebetween from the components of the candidates L for the optimal design parameter set.

In the example above, for the path $[A_1, T_1, A_2]$, since $[A_1, A_2]$ has been interpolated therebetween, it is not selected, but $[A_1, T_1]$ and $[T_1, A_2]$ are selected. For the path $[A_1, T_2, A_2]$, since $[A_1, A_2]$ has been interpolated therebetween, it is not selected, but $[A_1, T_2]$ and $[T_2, A_2]$ are selected. For the path $[A_1, T_3, A_2]$, since $[A_1, A_2]$ has been interpolated therebetween, it is not selected, but $[A_1, T_3]$ and $[T_3, A_2]$ are selected.

The process control unit 105-4 performs a series of processes from step S207 to S214 as stated above using the newly selected pair of design parameter sets A and B. That is, when the Euclidean distance between a pair of design parameter sets A and B is larger than a threshold r, the perpendicular bisector hyperplane P of the straight line connecting A and B in the design parameter space is calculated, and one or more interpolating points are set on the P for further interpolation between A and B (step S208).

For each interpolating point (see the loop process in steps S209 through S213), when the interpolating design parameter set corresponding to the interpolating point concerned is a non-dominated solution, it is stored as the optimal interpolating design parameter set (steps S209 through S212). Furthermore, the obtained optimal interpolating design parameter set is integrated into the candidates L for the optimal design parameter set, and new candidates L' for the optimal design parameter set are generated.

Generally, the components of the candidates L for the optimal design parameter set increase by repeating a series of processes in steps S206 through S215. Assume that the candidates for the optimal design parameter set are denoted as follows, $$L = [P_1, \ldots, P_i, P_{i+1}, \ldots, P_r]$$

and that the optimal interpolating design parameter sets newly obtained in the processes in steps S206 through S215 are denoted as $T = \{T_1, T_2, \ldots, T_d\}$.

Then, in the integrating process in step S214, the following candidates for the optimal design parameter set are newly generated on the basis of the relationship illustrated in FIG. 11, where the generated candidates are denoted by L' and correspond to the number d of paths.

$$L' = [P_1, \ldots, P_i, T_1, P_{i+1}, \ldots, P_r]$$
$$[P_1, \ldots, P_i, T_2, P_{i+1}, \ldots, P_r]$$
$$\ldots,$$
$$[P_1, \ldots, P_i, T_d, P_{i+1}, \ldots, P_r]$$

Each path (corresponding to each line in the equation above) in the candidates L' for the optimal design parameter set generated as described above is substituted for new candidates L for the optimal design parameter set. Then, a series of processes from step S207 to S214 as described above are repeatedly performed on all combinations of two design parameter sets A and B selected from the new candidates L for the optimal design parameter set.

Figure 12A:
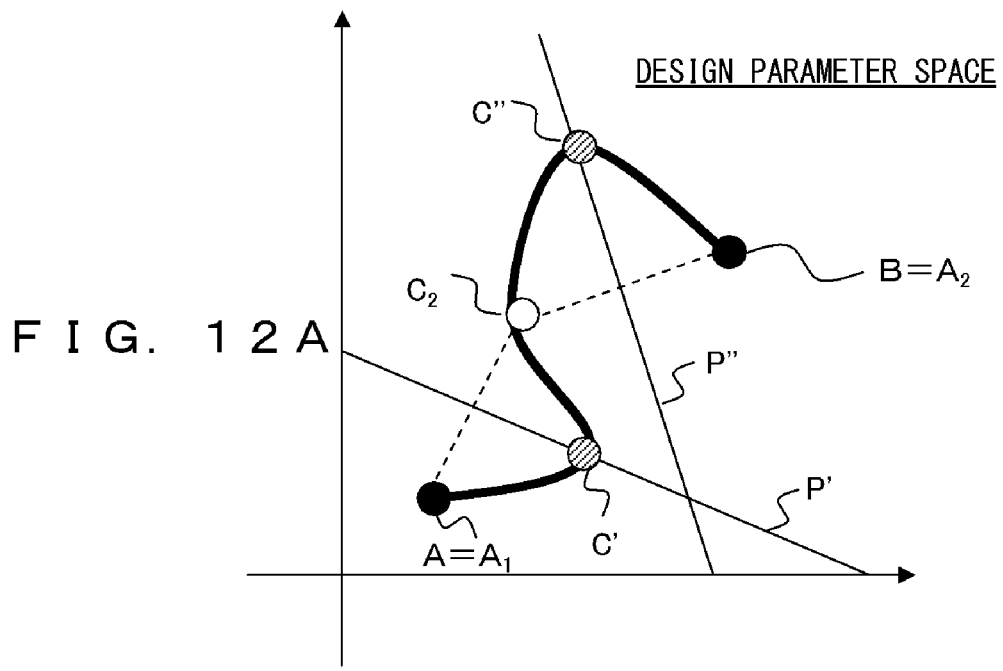
FIGS. 12A and 12B are explanatory views (3) of the operation of the slider transition relation calculation unit 105.
Figure 12B:
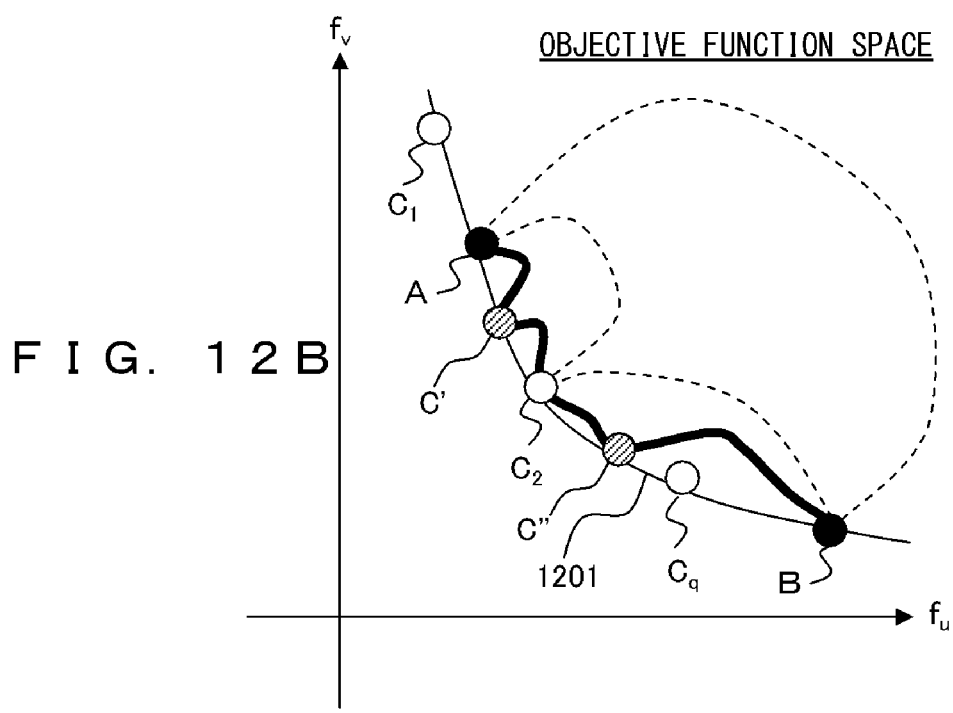
Figure 13A:
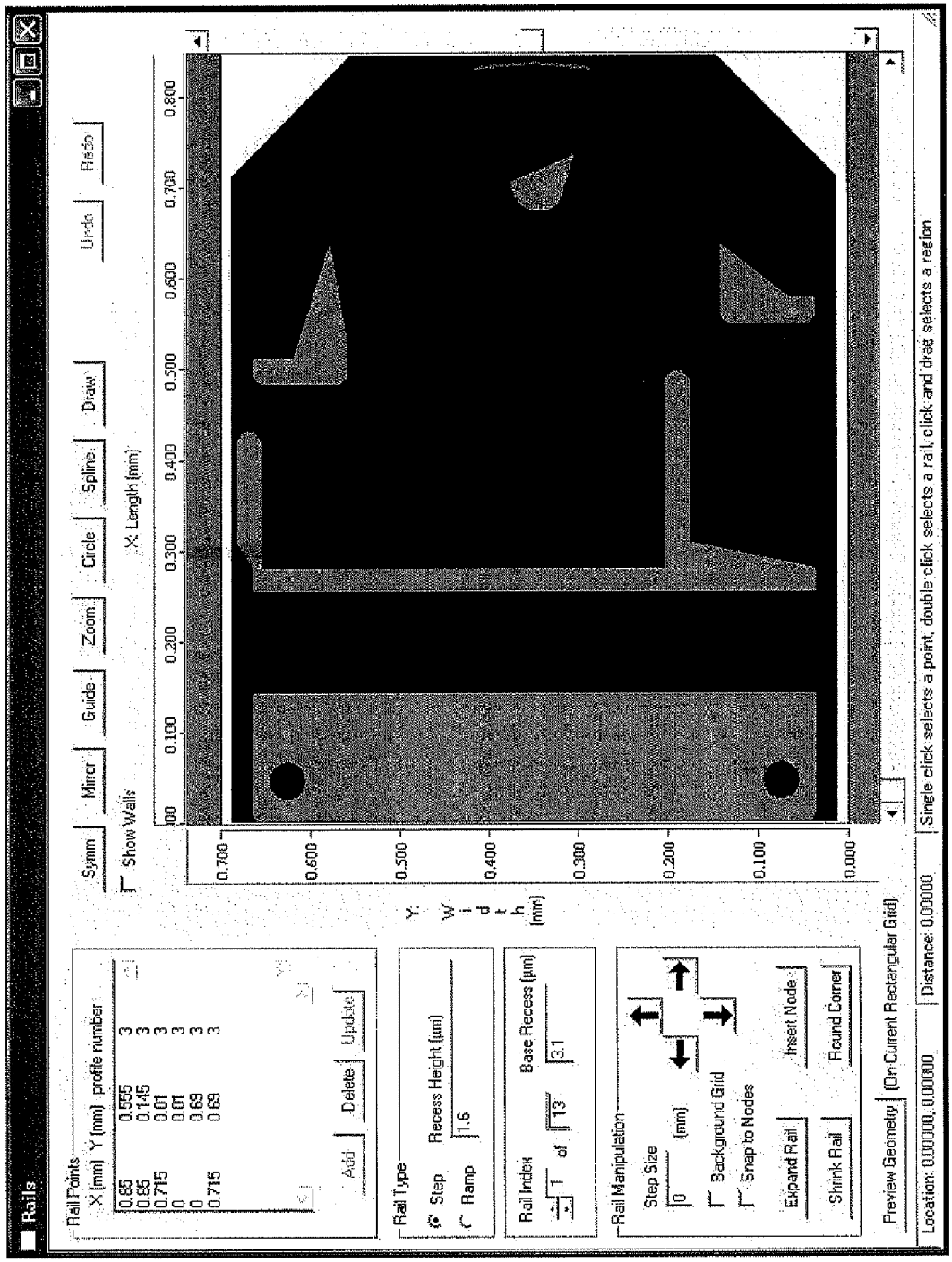
FIGS. 13A through 13E are examples of display of a slider shape.
Figure 13B:
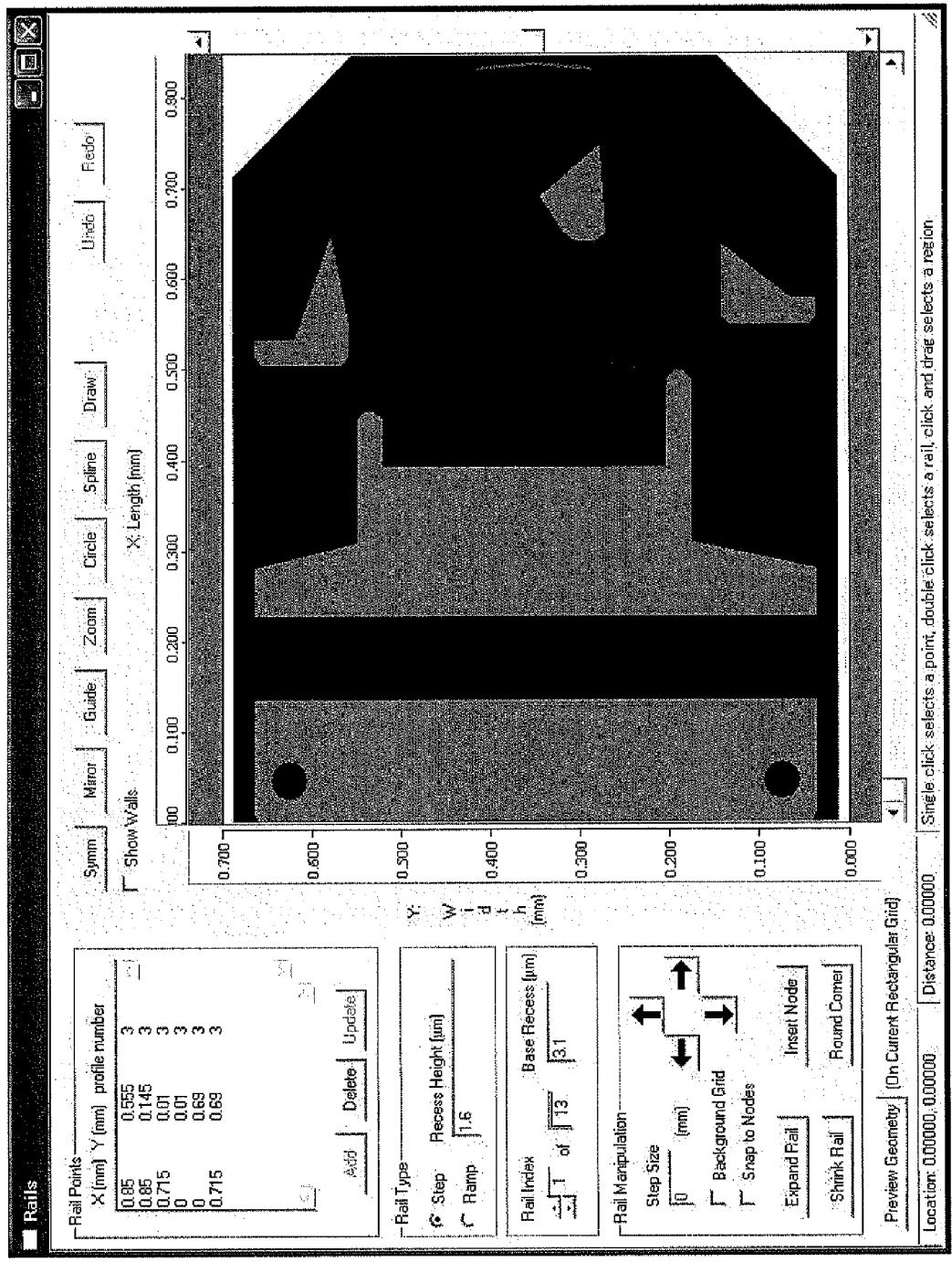
Figure 13C:
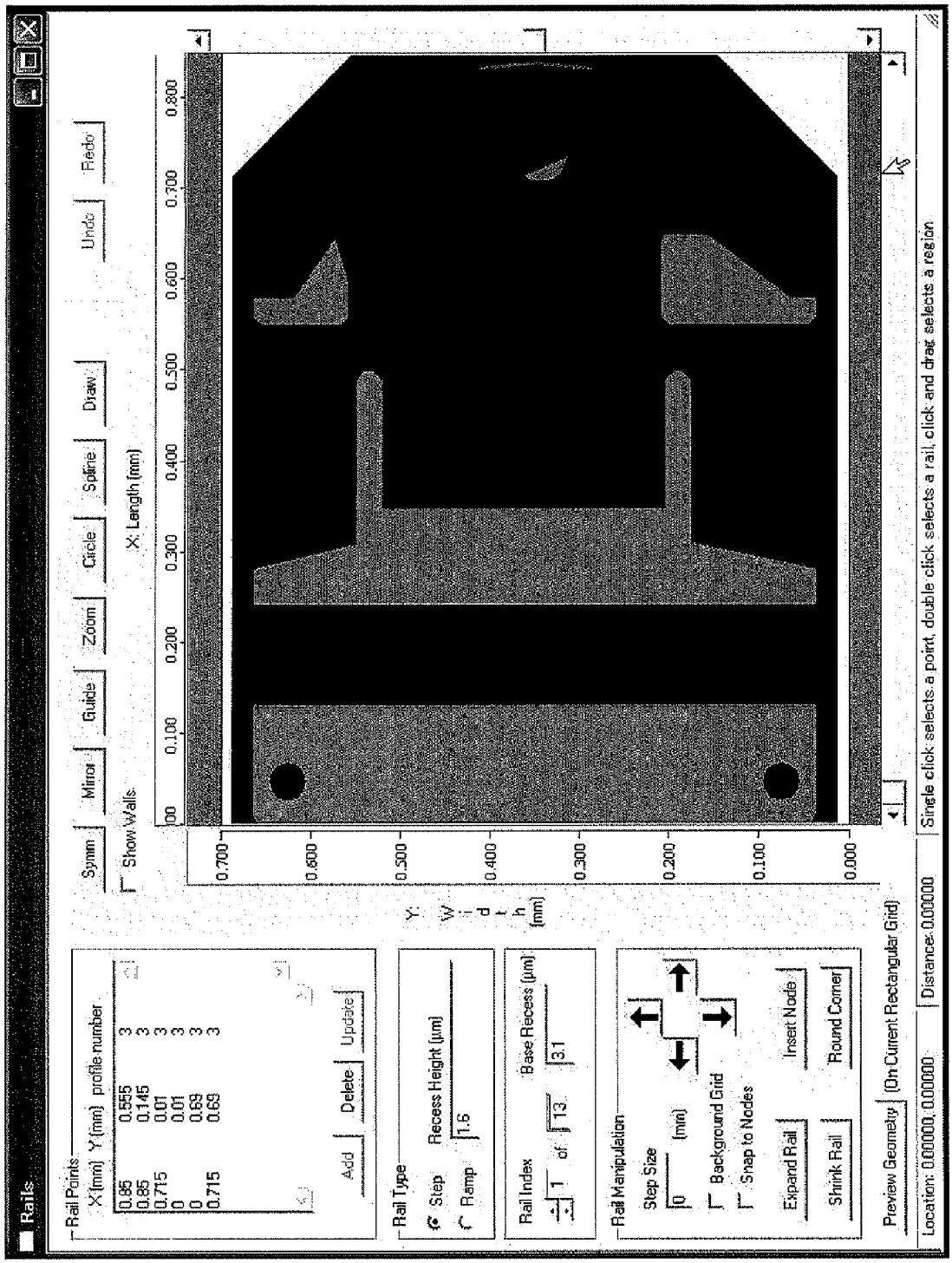
Figure 13D:
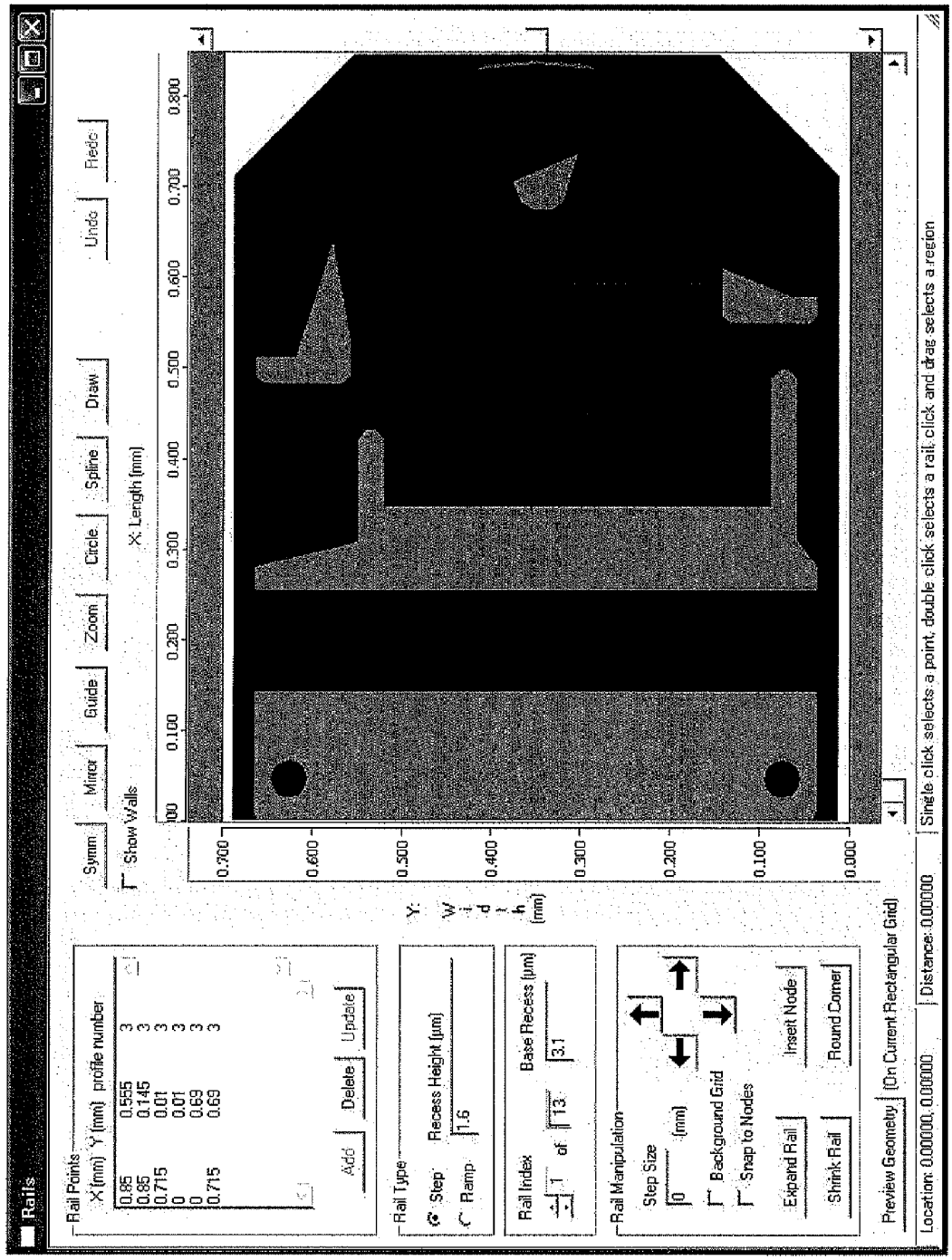
Figure 13E:
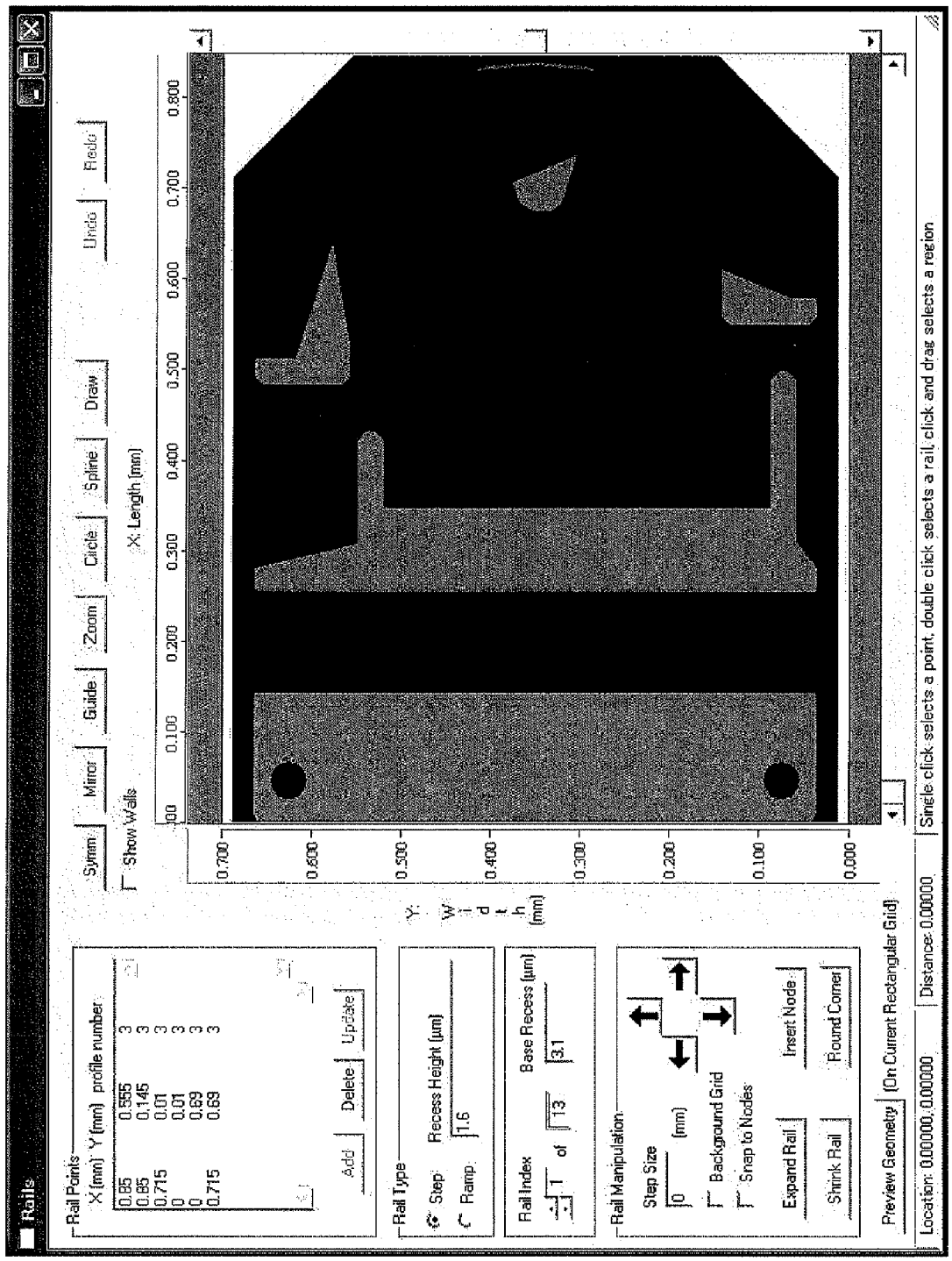
Figure 15:
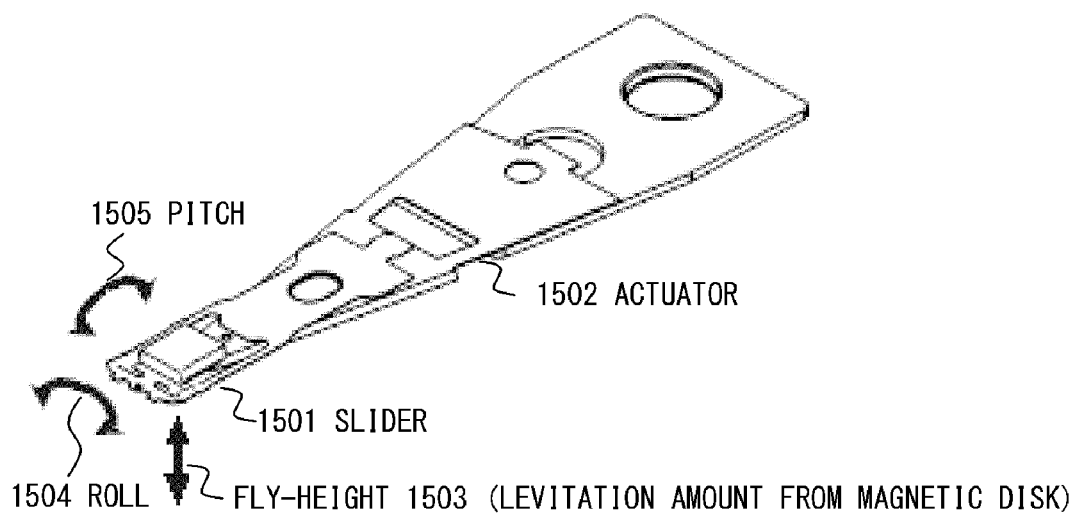
FIG. 15 is an explanatory view of a slider of a hard disk drive.

By repeating the above-mentioned processes, control is passed as follows. For example, in FIG. 7A, an optimal interpolating design parameter set $C_2$ interpolating between two candidates A and B for the optimal design parameter set is generated. Then, due to integration of the $C_2$ into A and B, as illustrated in FIG. 12A, perpendicular bisector hyperplanes P' and P'' are newly calculated respectively for two pairs of design parameter sets $[A, C_2]$ and $[C_2, B]$. Furthermore, from among respective interpolating points set on the perpendicular bisector hyperplanes P' and P'', new optimal interpolating design parameter sets C' and C'' on a Pareto boundary 1201 (same as the 702 in FIG. 7B) are calculated as illustrated in FIG. 12B.

When it is determined in step S215 that all combinations of two design parameter sets A and B not yet interpolated therebetween have been selected from the candidates L for the optimal design parameter set, the process control unit 105-4 performs the following process. That is, the process control unit 105-4 stores in the transition data storage unit 106 the candidates L for the optimal design parameter set as the finally obtained optimal design parameter sets.

As a result, when a designer provides the initial two candidates $A_1$ and $A_2$ for the optimal design parameter set and a threshold r specifying the granularity of interpolation, the slider transition relation calculation unit 105 can calculate the following one or more optimal interpolating design parameter sets. That is, the one or more optimal interpolating design parameter sets which are for interpolating between the initial two candidates A and B for the optimal design parameter set with the granularity of the threshold r in the design parameter space and which are non-dominated solutions (namely, optimal solutions on the Pareto boundary) are calculated.

When the one or more optimal design parameter sets are obtained in the transition data storage unit 106 as described above, the slider shape generation unit 107 illustrated in FIG. 1 calculates each slider shape corresponding to each optimal design parameter set obtained in the transition data storage unit 106. The slider shape generation unit 107 causes the optimal design parameter set relation information display unit 109 to display each slider shape as illustrated in FIGS. 13A through 13E.

In addition, the direction vector generation unit 108 illustrated in FIG. 1 generates a direction vector indicating a manner in which the design parameters change their values between each combination of adjacent ones in the optimal design parameter sets obtained in the transition data storage unit 106. Then, the direction vector generation unit 108 can also cause the optimal design parameter set relation information display unit 109 to display the generated direction vector.

Through the optimal design parameter set relation information display unit 109, the designer can obtain the information about how a slider shape can be changed between the two slider shapes corresponding to the initially provided two candidates $A_1$ and $A_2$ for the optimal design parameter set.

As described above, according to the present embodiment, the information can be obtained about how a slider shape can be changed between the slider shapes corresponding to the initially provided two candidates for the optimal design parameter set.

In addition, according to the present embodiment, a set of design parameter sets mapped near the Pareto boundary and gradually changing can be analyzed while deriving non-dominated solutions in a short time on the basis of the mathematical expression approximation of objective functions. Therefore, according to the present embodiment, a plurality of design shapes resulting in high performance can be implied and a hint of considering a new basic shape can be provided for a designer.

FIG. 14 illustrates an example of a hardware configuration of a computer capable of realizing a system according to the present embodiment illustrated in FIG. 1.

The computer illustrated in FIG. 14 includes a CPU 1401, memory 1402, an input device 1403, an output device 1404, an external storage device 1405, a portable record medium drive device 1406 to which a portable record medium 1409 is inserted, and a network connection device 1407. In the computer illustrated in FIG. 14, each of the components is interconnected to one another via a bus 1408. The configuration illustrated in FIG. 14 is an example of a computer capable of realizing the above-mentioned system, and the computer is not limited to the configuration illustrated in FIG. 14.

The CPU 1401 controls the entirety of the computer. The memory 1402 can be RAM (random access memory) etc. temporarily storing a program or data stored in the external storage device 1405 (or portable record medium 1409) when the program is executed, data is updated, etc. The CPU 1401 controls the entirety of the computer by reading the program to the memory 1402 and executing the program.

The input device 1403 includes, for example, a keyboard, a mouse, etc. and the interface control devices for them. The input device 1403 detects an inputting operation by a user via the keyboard, the mouse, etc., and notifies the CPU 1401 of the detection result.

The output device 1404 includes a display device, a printer device, etc. and the interface control devices for them. The output device 1404 outputs data transmitted according to the control of the CPU 1401 to the display device or the printer device.

The external storage device 1405 is, for example, a hard disk drive storage device. It is mainly used in storing various data and programs.

The portable record medium drive device 1406 holds the portable record medium 1409 such as an optical disk, SDRAM (synchronous dynamic random access memory), CompactFlash, etc., and functions as an assistant to the external storage device 1405.

The network connection device 1407 is a device for connection with a communication line of, for example, a LAN (local area network) or a WAN (wide area network).

The system according to the present embodiment is realized by the CPU 1401 executing a program loaded with the function blocks illustrated in FIG. 1. The program can be recorded on the external storage device 1405 or the portable record medium 1409 to be distributed, or can be acquired from a network through the network connection device 1407.

The above-described present embodiment exemplifies a case in which the present invention is embodied as a design support device for supporting the slider design of a hard disk drive, but the present invention is not limited to this application, and can be applied to various devices for supporting designing while performing multiobjective optimization.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optimal solution relation display apparatus, comprising:

an objective function approximation unit configured
to receive, from an input device, input of a particular number of sample sets, wherein each sample set includes
a set of values of a plurality of design parameters and
a set of values of a plurality of objective functions calculated in advance corresponding to the values of the plurality of design parameters, and
to cause a processor to calculate a plurality of objective function approximating equations by approximating each of the plurality of objective functions by a mathematical equation;

an initial optimal design parameter set candidate selection unit configured to cause the processor to select, as candidates for an optimal design parameter set in an initial state, two or more from among sets of the values of the plurality of design parameters included in the sample sets, wherein the two or more correspond to non-dominated solutions in a cost evaluation for a pair of objective functions among the plurality of objective functions;

an interpolating design parameter set calculation unit configured to cause the processor to calculate, as one or more interpolating design parameter sets, one or more sets of values of the plurality of design parameters that interpolate between two adjacent components in the candidates;

an objective function calculation unit configured to cause the processor to approximate values of the plurality of objective functions using the plurality of objective function approximating equations for each of the calculated one or more interpolating design parameter sets;

an optimal interpolating design parameter set selection unit configured to cause the processor to select, as an optimal interpolating design parameter set, an interpolating design parameter set in the calculated one or more interpolating design parameter sets corresponding to a non-dominated solution in the cost evaluation for a pair of objective functions among the plurality of objective functions whose values have been approximated;

a process control unit configured
to perform integration of the optimal interpolating design parameter set into the candidates to define a result of the integration as new candidates,
to cause the processor to determine whether to perform a continuing process or to perform an output process by determining a parameter distance between components in the new candidates,
to input the new candidates into the interpolating design parameter set calculation unit and to return control to the interpolating design parameter set calculation unit when the continuing process is determined to perform, and
to cause the processor to output the new candidates as final optimal design parameter sets when the output process is determined to perform; and an optimal design parameter set relation information display unit configured to cause a display device to display information relating to the output final optimal design parameter sets.

2. The optimal solution relation display apparatus according to claim 1, further comprising
a constant parameter exclusion unit configured to exclude
a design parameter indicating a value change equal to or smaller than a threshold, wherein the value change is a change between components in the candidates selected in the initial state,
from the candidates, the one or more interpolating design parameter sets, and the final optimal design parameter sets.

3. The optimal solution relation display apparatus according to claim 1, wherein
the optimal design parameter set relation information display unit displays a design shape corresponding to each component in the final optimal design parameter sets.

4. The optimal solution relation display apparatus according to claim 1, wherein
the optimal design parameter set relation information display unit displays direction vector information indicating a change between two adjacent components in the final optimal design parameter sets.

5. The optimal solution relation display apparatus according to claim 1, wherein
the one or more interpolating design parameter sets calculated by the interpolating design parameter set calculation unit respectively correspond, in a design parameter space whose each coordinate axis is defined by each of the plurality of design parameters, to one or more coordinate points on a perpendicular bisector hyperplane of a straight line connecting two coordinate points corresponding to the two adjacent components in the candidates.

6. The optimal solution relation display apparatus according to claim 1, wherein
the objective function approximation unit polynomially approximates each of the plurality of objective functions by a multiple regression equation using a multiple regression analysis on a basis of the particular number of sample sets.

7. The optimal solution relation display apparatus according to claim 1, wherein
the plurality of design parameters are for defining a shape of a slider unit of a hard disk drive.

8. An optimal solution relation display method, comprising:
receiving, from an input device, input of a particular number of sample sets, wherein each sample set includes
a set of values of a plurality of design parameters and
a set of values of a plurality of objective functions calculated in advance corresponding to the values of the plurality of design parameters;
calculating, by a processor, a plurality of objective function approximating equations by approximating each of the plurality of objective functions by a mathematical equation;
selecting, by the processor, as candidates for an optimal design parameter set in an initial state, two or more from among sets of the values of the plurality of design parameters included in the sample sets, wherein the two or more correspond to non-dominated solutions in a cost evaluation for a pair of objective functions among the plurality of objective functions;
calculating, by the processor, as one or more interpolating design parameter sets, one or more sets of values of the plurality of design parameters that interpolate between two adjacent components in the candidates;
approximating, by the processor, values of the plurality of objective functions using the plurality of objective function approximating equations for each of the calculated one or more interpolating design parameter sets;
selecting, by the processor, as an optimal interpolating design parameter set, an interpolating design parameter set in the calculated one or more interpolating design parameter sets corresponding to a non-dominated solution in the cost evaluation for a pair of objective functions among the plurality of objective functions whose values have been approximated;
performing, by the processor, integration of the optimal interpolating design parameter set into the candidates to define a result of the integration as new candidates;
determining, by the processor, whether to perform a continuing process or to perform an output process by determining a parameter distance between components in the new candidates;
returning, by the processor, control to calculation of the one or more interpolating design parameter sets with inputting the new candidates in order to calculate new one or more interpolating design parameter sets when the continuing process is determined to perform;
outputting, by the processor, the new candidates as final optimal design parameter sets when the output process is determined to perform; and
displaying, by a display device information relating to the output final optimal design parameter sets.

9. The optimal solution relation display method according to claim 8, further comprising
excluding
a design parameter indicating a value change equal to or smaller than a threshold, wherein the value change is a change between components in the candidates selected in the initial state,
from the candidates, the one or more interpolating design parameter sets, and the final optimal design parameter sets.

10. The optimal solution relation display method according to claim 8, wherein
a design shape corresponding to each component in the final optimal design parameter sets is displayed as the information relating to the output final optimal design parameter sets.

11. The optimal solution relation display method according to claim 8, wherein
direction vector information indicating a change between two adjacent components in the final optimal design parameter sets is displayed as the information relating to the output final optimal design parameter sets.

12. The optimal solution relation display method according to claim 8, wherein
the calculated one or more interpolating design parameter sets respectively correspond, in a design parameter space whose each coordinate axis is defined by each of the plurality of design parameters, to one or more coordinate points on a perpendicular bisector hyperplane of a straight line connecting two coordinate points corresponding to the two adjacent components in the candidates.

13. The optimal solution relation display method according to claim 8, wherein
the calculating the plurality of objective function approximating equations includes polynomially approximating each of the plurality of objective functions by a multiple regression equation using a multiple regression analysis on a basis of the particular number of sample sets.

14. The optimal solution relation display method according to claim 8, wherein
the plurality of design parameters are for defining a shape of a slider unit of a hard disk drive.

15. A non-transitory computer-readable record medium storing a program used to direct a computer to perform a process, the process comprising:
receiving input of a particular number of sample sets, wherein each sample set includes
a set of values of a plurality of design parameters and
a set of values of a plurality of objective functions calculated in advance corresponding to the values of the plurality of design parameters;
calculating a plurality of objective function approximating equations by approximating each of the plurality of objective functions by a mathematical equation;
selecting, as candidates for an optimal design parameter set in an initial state, two or more from among sets of the values of the plurality of design parameters included in the sample sets, wherein the two or more correspond to non-dominated solutions in a cost evaluation for a pair of objective functions among the plurality of objective functions;
calculating, as one or more interpolating design parameter sets, one or more sets of values of the plurality of design parameters that interpolate between two adjacent components in the candidates;
approximating values of the plurality of objective functions using the plurality of objective function approximating equations for each of the calculated one or more interpolating design parameter sets;
selecting, as an optimal interpolating design parameter set, an interpolating design parameter set in the calculated one or more interpolating design parameter sets corresponding to a non-dominated solution in the cost evaluation for a pair of objective functions among the plurality of objective functions whose values have been approximated;
performing integration of the optimal interpolating design parameter set into the candidates to define a result of the integration as new candidates;
determining whether to perform a continuing process or to perform an output process by determining a parameter distance between components in the new candidates;
returning control to calculation of the one or more interpolating design parameter sets with inputting the new candidates in order to calculate new one or more interpolating design parameter sets when the continuing process is determined to perform;
outputting the new candidates as final optimal design parameter sets when the output process is determined to perform; and
displaying information relating to the output final optimal design parameter sets.

16. The record medium according to claim 15, the process further comprising
excluding
a design parameter indicating a value change equal to or smaller than a threshold, wherein the value change is a change between components in the candidates selected in the initial state,
from the candidates, the one or more interpolating design parameter sets, and the final optimal design parameter sets.

17. The record medium according to claim 15, wherein
a design shape corresponding to each component in the final optimal design parameter sets is displayed as the information relating to the output final optimal design parameter sets.

18. The record medium according to claim 15, wherein
direction vector information indicating a change between two adjacent components in the final optimal design parameter sets is displayed as the information relating to the output optimal design parameter sets.

19. The record medium according to claim 15, wherein
the calculated one or more interpolating design parameter sets respectively correspond, in a design parameter space whose each coordinate axis is defined by each of the plurality of design parameters, to one or more coordinate points on a perpendicular bisector hyperplane of a straight line connecting two coordinate points corresponding to the two adjacent components in the candidates.

20. The record medium according to claim 15, wherein
the calculating the plurality of objective function approximating equations includes polynomially approximating each of the plurality of objective functions by a multiple regression equation using a multiple regression analysis on a basis of the particular number of sample sets.

\* \* \* \* \*